(12) United States Patent
Sawada et al.

(10) Patent No.: US 9,627,143 B2
(45) Date of Patent: Apr. 18, 2017

(54) MULTILAYER CERAMIC ELECTRONIC COMPONENT INCLUDING A PAIR OF SIDE OUTER ELECTRODES AND A CENTER ELECTRODE

(71) Applicant: Murata Manufacturing Co., Ltd., Nagaokakyo-shi, Kyoto-fu (JP)

(72) Inventors: Takashi Sawada, Nagaokakyo (JP); Yohei Mukobata, Nagaokakyo (JP); Sui Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 99 days.

(21) Appl. No.: 14/823,184

(22) Filed: Aug. 11, 2015

(65) Prior Publication Data

US 2016/0049242 A1    Feb. 18, 2016

(30) Foreign Application Priority Data

Aug. 13, 2014   (JP) .................. 2014-164830

(51) Int. Cl.
| | | |
|---|---|---|
| H01G 4/30 | (2006.01) | |
| H01G 4/012 | (2006.01) | |
| H01G 4/12 | (2006.01) | |
| H01G 4/232 | (2006.01) | |

(52) U.S. Cl.
CPC .............. *H01G 4/30* (2013.01); *H01G 4/012* (2013.01); *H01G 4/2325* (2013.01); *H01G 4/12* (2013.01)

(58) Field of Classification Search
CPC ........ H01G 4/30; H01G 4/012; H01G 4/2325; H01G 4/12

USPC ....................................................... 361/301.4
See application file for complete search history.

(56) References Cited

U.S. PATENT DOCUMENTS

| | | | |
|---|---|---|---|
| 2008/0186652 A1 | 8/2008 | Lee et al. | |
| 2010/0149769 A1 | 6/2010 | Lee et al. | |
| 2012/0300361 A1* | 11/2012 | Togashi | H01G 4/30 |
| | | | 361/301.4 |
| 2013/0050893 A1 | 2/2013 | Kim | |
| 2013/0050897 A1 | 2/2013 | Kim | |
| 2013/0050899 A1 | 2/2013 | Kim et al. | |
| 2013/0058006 A1 | 3/2013 | Kim | |
| 2014/0160618 A1 | 6/2014 | Yoon et al. | |
| 2015/0243438 A1* | 8/2015 | Ahn | H01G 4/012 |
| | | | 174/258 |

(Continued)

FOREIGN PATENT DOCUMENTS

| | | |
|---|---|---|
| JP | 2013-046052 A | 3/2013 |
| KR | 10-2014-0038871 A | 3/2014 |
| KR | 10-2014-0038872 A | 3/2014 |

(Continued)

*Primary Examiner* — Eric Thomas
*Assistant Examiner* — Michael P McFadden
(74) *Attorney, Agent, or Firm* — Keating & Bennett, LLP

(57) ABSTRACT

A multilayer ceramic electronic component includes a multilayer ceramic element with first through sixth surfaces, a center outer electrode located between a first-side outer electrode and a second-side outer electrode on the multilayer ceramic element. A first plated film is provided on the center outer electrode, second plated films are provided on the first-side outer electrode and the second-side outer electrode, respectively, and a thickness of each of the second plated films is greater than a thickness of the first plated film.

19 Claims, 27 Drawing Sheets

(56) References Cited

U.S. PATENT DOCUMENTS

2015/0318113 A1* 11/2015 Kim ...................... H01G 4/232
174/260

FOREIGN PATENT DOCUMENTS

| KR | 10-2014-0038876 A | 3/2014 |
|---|---|---|
| KR | 10-2014-0038911 A | 3/2014 |
| KR | 10-2014-0038912 A | 3/2014 |
| KR | 10-2014-0038914 A | 3/2014 |
| KR | 10-2014-0038915 A | 3/2014 |
| KR | 10-2014-0038916 A | 3/2014 |
| KR | 10-2014-0039016 A | 3/2014 |
| KR | 10-1376925 B1 | 3/2014 |

\* cited by examiner

FIG. 5
(I)
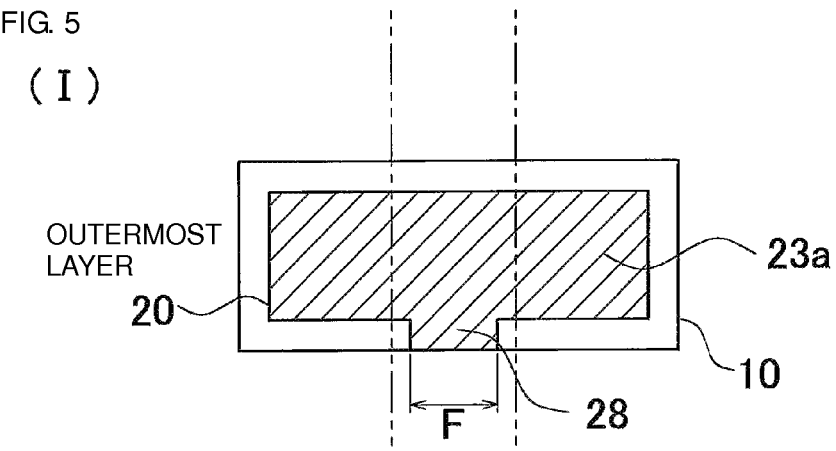
(II)
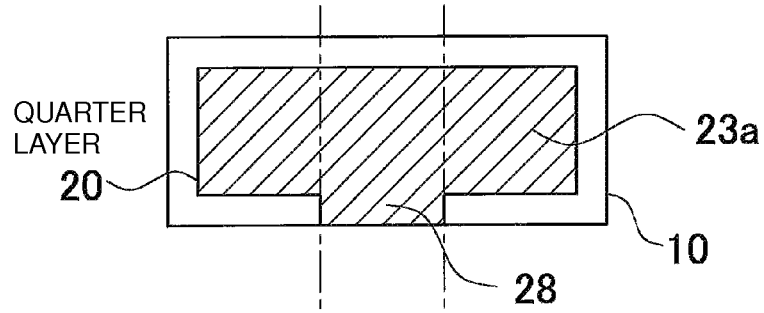
(III)
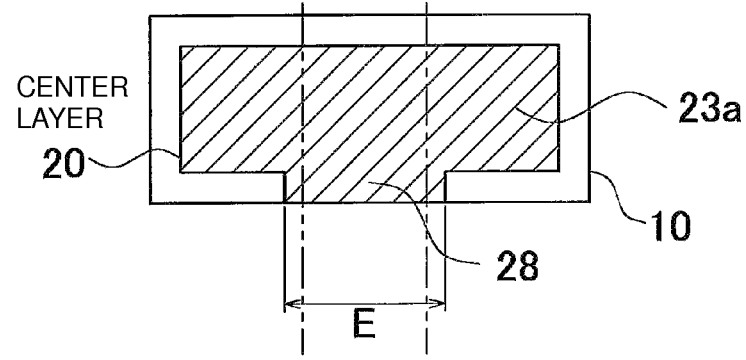

FIG. 6
(I)
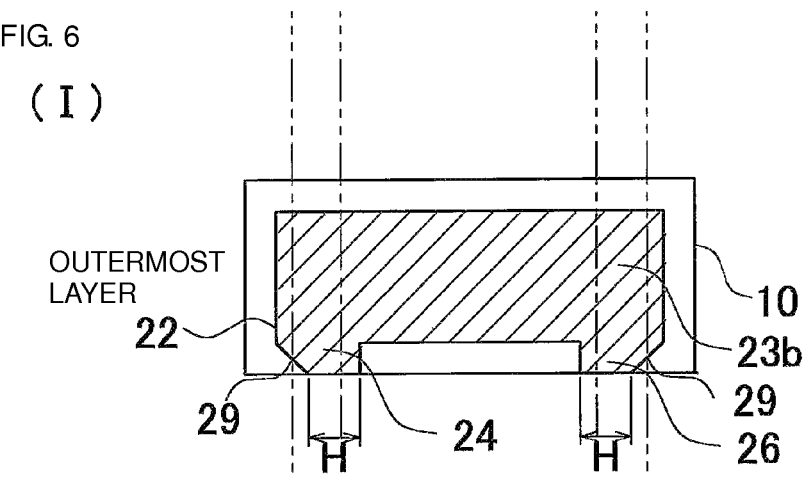
(II)
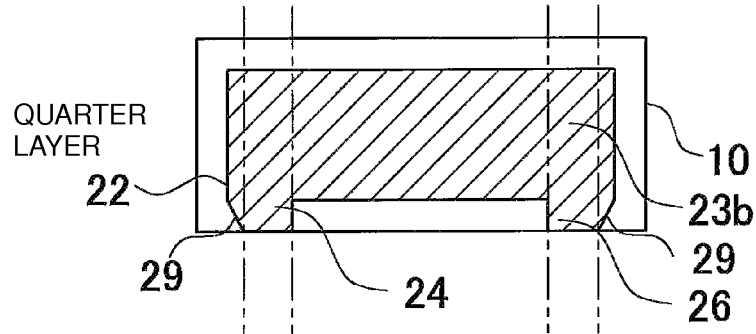
(III)
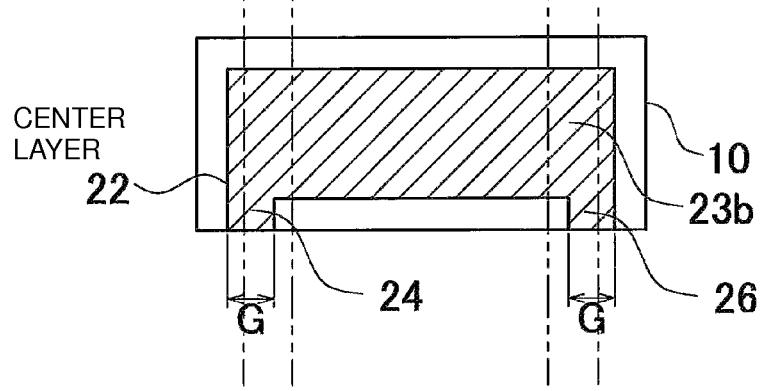

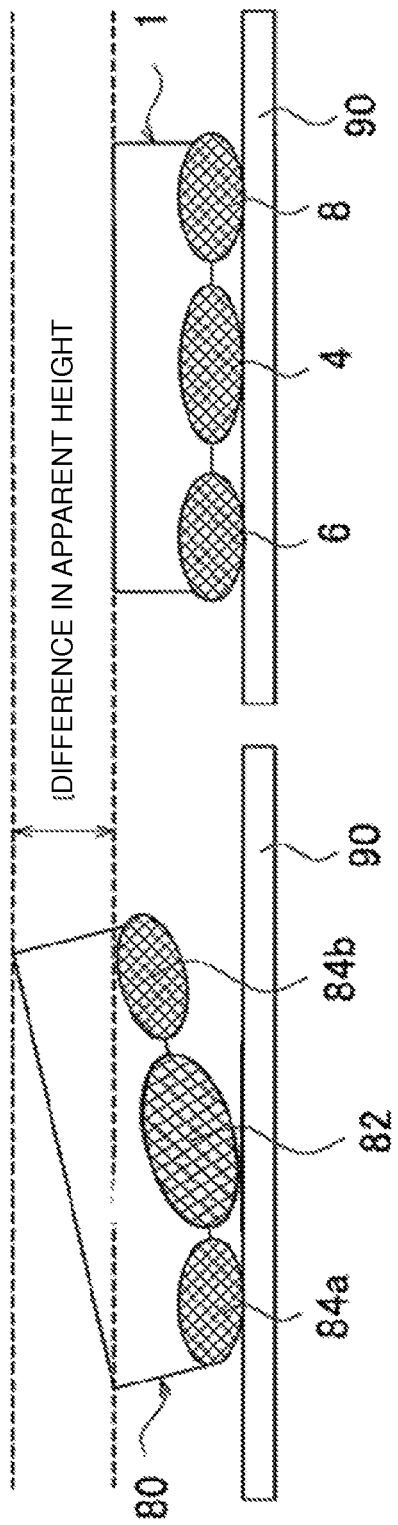

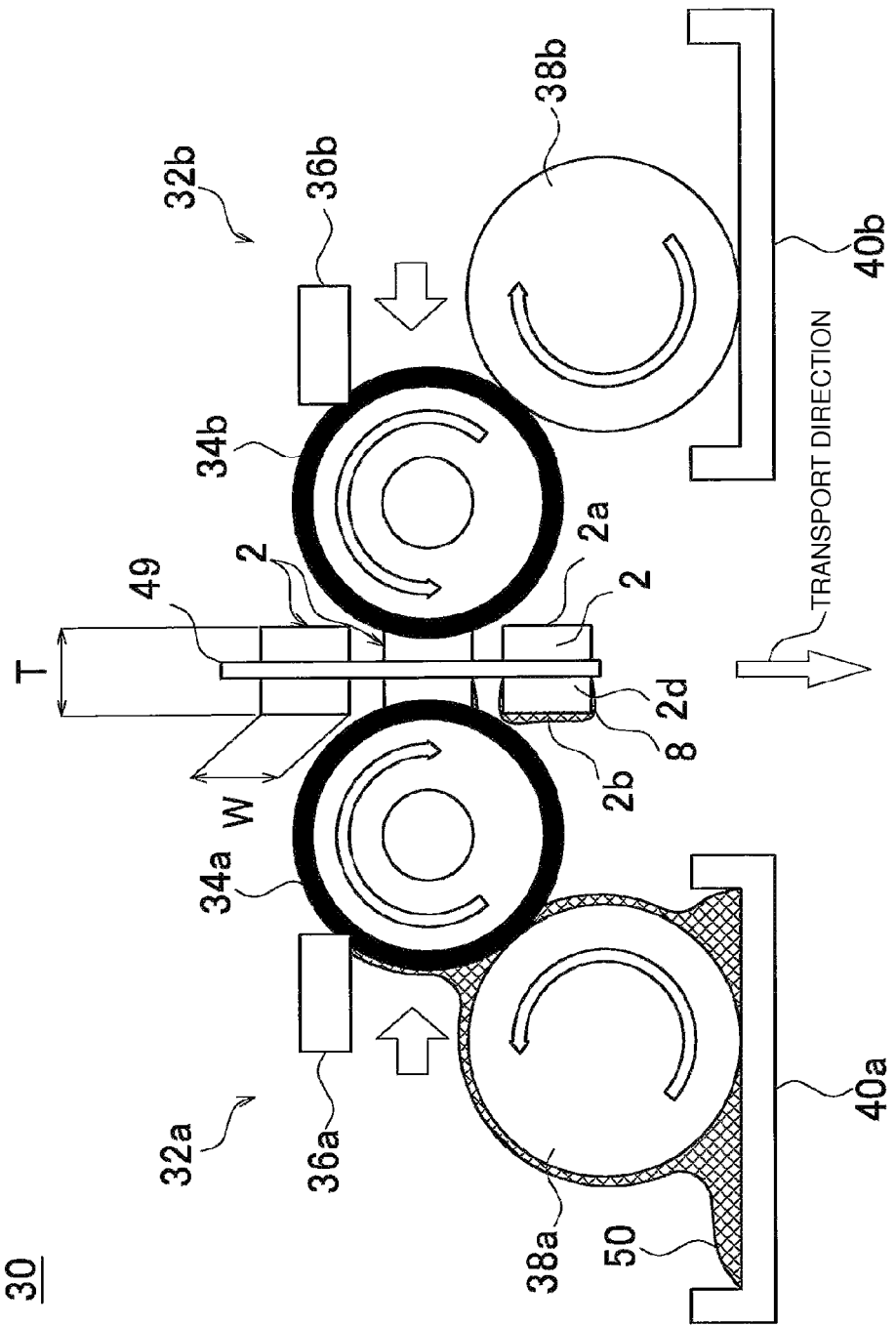

MULTILAYER CERAMIC ELECTRONIC COMPONENT INCLUDING A PAIR OF SIDE OUTER ELECTRODES AND A CENTER ELECTRODE

BACKGROUND OF THE INVENTION

1. Field of the Invention

The present invention relates to a multilayer ceramic electronic component such as a multilayer ceramic capacitor.

2. Description of the Related Art

As disclosed in Japanese Unexamined Patent Application Publication No. 2013-46052 (FIGS. 8 to 10), a three-terminal multilayer ceramic capacitor which includes a center outer electrode provided on a center portion on a surface of the multilayer ceramic element and side outer electrodes provided on opposite end portions on the surface of the multilayer ceramic element so as to interpose the center outer electrode therebetween is known. The term "three-terminal" means that three terminals as terminals of the capacitor are electrically connected to an installation board.

The three-terminal multilayer ceramic capacitor has a structure in which the inner electrodes are arranged so as to be orthogonal to an installation surface of the multilayer ceramic capacitor and a lamination direction thereof is parallel with the installation surface.

However, the multilayer ceramic capacitor with such a structure has a disadvantage in that cracking easily occurs at or near an outermost layer of the multilayer ceramic element. In addition, the multilayer ceramic capacitor with such a structure is required to have satisfactory installation properties with respect to the installation board.

SUMMARY OF THE INVENTION

Accordingly, preferred embodiments of the present invention provide a multilayer ceramic electronic component, in which cracking does not easily occur at or near an outermost layer of a multilayer ceramic element, and which has a satisfactory installation property with respect to an installation board.

According to a preferred embodiment of the present invention, a multilayer ceramic electronic component includes a multilayer ceramic element including a first surface and a second surface extending in a length direction and a width direction, a third surface and a fourth surface extending in the width direction and a height direction, and a fifth surface and a sixth surface extending in the length direction and the height direction, a first-side outer electrode and a second-side outer electrode which are on opposite end portions of the second surface and a center outer electrode between the first-side outer electrode and the second-side outer electrodes, first inner electrodes which extend in the length direction and the height direction, and second inner electrodes which extend in the length direction and the height direction and face the first inner electrode at interval in the width direction, wherein each of the first inner electrodes includes a first facing portion which faces one of the second inner electrodes, and a center extending portion which extends from the first facing portion to the second surface and is exposed at the second surface, each of the second inner electrodes includes a second facing portion which faces one of the first inner electrodes, a first-side extending portion which extends from the second facing portion to the second surface and is exposed at a portion of the second surface on one side in the length direction, and a second-side extending portion which extends from the second facing portion to the second surface and is exposed at a portion of the second surface on another side in the length direction, wherein the center outer electrode includes a center main body on the second surface and connected to the center extending portions and center extension bodies connecting the center main body and respectively located on the fifth and sixth surfaces, the first-side outer electrode includes a side main body which is located on the second surface and connected to the first-side extending portions and side extension bodies connecting the side main body and which are respectively located on the fifth and sixth surfaces, the second-side outer electrode includes a side main body which is located on the second surface and connected to the second-side extending portions and side extension bodies connecting the side main body and which are respectively located on the fifth and sixth surfaces, a first plated film is provided on the center outer electrode, second plated films are provided on the first-side outer electrode and the second-side outer electrode, respectively, and a thickness of each of the second plated films is greater than a thickness of the first plated film.

It is preferable that a dimension of the center main body in the length direction is greater than a dimension of each of the side main bodies of the first-side outer electrode and the second-side outer electrode in the length direction.

It is preferable that the first plated film includes a first Ni-plated film and a first Sn-plated film provided on the Ni-plated film, and each of the second plated films on the first-side outer electrode and the second-side outer electrode includes a second Ni-plated film and a second Sn-plated film provided on the second Ni-plated film.

It is preferable that a thickness of each of the second Ni-plated films of the second plated films on the first-side outer electrode and the second-side outer electrode is greater than a thickness of the first Ni-plated film of the first plated film.

It is preferable that the thickness of the first plated film is equal to or greater than about 6 μm and equal to or less than about 8 μm, and the thickness of each of the second plated films is equal to or greater than about 9 μm and equal to or less than about 11 μm.

It is preferable that the thickness of the Ni-plated film of the first plated film is equal to or greater than about 2 μm and equal to or less than about 3 μm, and the thickness of each of the Ni-plated films of the second plated films on the first-side outer electrode and the second-side outer electrode is equal to or greater than about 4 μm and equal to or less than about 5 μm.

It is preferable that the second inner electrodes are separated from the third surface and the fourth surface, the first-side outer electrode includes a side extension body connected to the side main body of the first-side outer electrode and located on the third surface, and the second-side outer electrode includes a side extension body connected to the side main body of the second-side outer electrode and located on the fourth surface.

It is preferable that a distance between an exposed end of the first-side extending portion positioned nearest to a center of the multilayer ceramic element in the width direction and the third surface is denoted by a distance C, and a distance between an exposed end of the first-side extending portion positioned outermost in the width direction and the third surface is denoted by a distance D, the distance D is greater than the distance C.

It is preferable that a length of an exposed end of the second-side extending portion positioned nearest to a center of the multilayer ceramic element in the width direction is denoted by a length G, and a length of an exposed end of the second-side extending portion positioned outermost in the width direction is denoted by a length H, the length G is greater than the length H.

It is preferable that a length of an exposed end of the center extending portion positioned nearest to a center of the multilayer ceramic element in the width direction is denoted by a length E, and a length of exposed end of the center extending portion positioned outermost in the width direction is denoted by a length F, the length E is greater than the length F.

It is preferable that at least one of the side main bodies includes a thickest portion which is located at a different position from a center of the at least one of the side main bodies in the width direction.

According to another preferred embodiment of the present invention, a multilayer ceramic electronic component includes a multilayer ceramic element including a first surface and a second surface extending in a length direction and a width direction, a third surface and a fourth surface extending in the width direction and a height direction, and a fifth surface and a sixth surface extending in the length direction and the height direction, a first-side outer electrode and a second-side outer electrode which are on opposite end portions of the second surface and a center outer electrode between the first-side outer electrode and the second-side outer electrodes, first inner electrodes which extend in the length direction and the height direction, and second inner electrodes which extend in the length direction and the height direction and face the first inner electrode at interval in the width direction, wherein each of the first inner electrodes includes a first facing portion which faces one of the second inner electrodes, and a center extending portion which extends from the first facing portion to the second surface and is exposed at the second surface, each of the second inner electrodes includes a second facing portion which faces one of the first inner electrode, a first-side extending portion which extends from the second facing portion to the second surface and is exposed at portion of the second surface on one side in the length direction, and a second-side extending portion which extends from the second facing portion to the second surface and is exposed at portion of the second surface on another side in the length direction, wherein the center outer electrode includes a center main body on the second surface and connected to the center extending portions and center extension bodies connecting the center main body and respectively located on the fifth and sixth surfaces, the first-side outer electrode includes a side main body which is located on the second surface and connected to the first-side extending portions and side extension bodies connecting the side main body and which are respectively located on the fifth and sixth surfaces, the second-side outer electrode includes a side main body which is located on the second surface and connected to the second-side extending portions and side extension bodies connecting the side main body and which are respectively located on the fifth and sixth surfaces, a Ni-plated film is provided on the center outer electrode, Ni-plated films are provided on the first-side outer electrode and the second-side outer electrode, respectively, and a thickness of each of the Ni-plated films on the first-side outer electrode and the second-side outer electrode is greater than a thickness of the Ni-plated film on the center outer electrode.

It is preferable that a dimension of the center main body in the length direction is greater than a dimension of each of the side main bodies of the first-side outer electrode and the second-side outer electrode in the length direction.

It is preferable that the thickness of the Ni-plated film on the center outer electrode is equal to or greater than about 2 μm and equal to or less than about 3 μm, and the thickness of each of the Ni-plated films on the first-side outer electrode and the second-side outer electrode is equal to or greater than about 4 μm and equal to or less than about 5 μm.

It is preferable that the second inner electrodes are separated from the third surface and the fourth surface, the first-side outer electrode includes a side extension body connected to the side main body of the first-side outer electrode and located on the third surface, and the second-side outer electrode includes a side extension body connected to the side main body of the second-side outer electrode and located on the fourth surface.

It is preferable that a distance between an exposed end of the first-side extending portion positioned nearest to a center of the multilayer ceramic element in the width direction and the third surface is denoted by a distance C, and a distance between an exposed end of the first-side extending portion positioned outermost in the width direction and the third surface is denoted by a distance D, the distance D is greater than the distance C.

It is preferable that a length of an exposed end of the second-side extending portion positioned nearest to a center of the multilayer ceramic element in the width direction is denoted by a length G, and a length of an exposed end of the second-side extending portion positioned outermost in the width direction is denoted by a length H, the length G is greater than the length H.

It is preferable that a length of an exposed end of the center extending portion positioned nearest to a center of the multilayer ceramic element in the width direction is denoted by a length E, and a length of exposed end of the center extending portion positioned outermost in the width direction is denoted by a length F, the length E is greater than the length F.

It is preferable that at least one of the side main bodies includes a thickest portion which is located at a different position from a center of the at least one of the side main bodies in the width direction.

According to various preferred embodiments of the present invention, it is possible to obtain a multilayer ceramic electronic component, in which cracking does not easily occur in at or near the outermost layer of a multilayer ceramic element, and which is satisfactorily installed on an installation board.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is an explanatory diagram illustrating a first inner electrode and a center extending portion.

FIG. 6 is an explanatory diagram illustrating second inner electrodes and a first-side extending portion and a second-side extending portion.

FIGS. 8A and 8B are explanatory diagrams illustrating an effect of the multilayer ceramic electronic component according to a preferred embodiment of the present invention.

FIG. 23 is an outline configuration diagram showing an application apparatus for applying outer electrode paste to the multilayer ceramic electronic component.

DETAILED DESCRIPTION OF THE PREFERRED EMBODIMENTS

Preferred embodiments of a multilayer ceramic electronic component according to the present invention will be described. Although the following preferred embodiments will be described as non-limiting examples in which the multilayer ceramic electronic component is a multilayer ceramic capacitor, the present invention is not limited thereto. For example, the multilayer ceramic electronic component may be a multilayer ceramic varistor.

Figure 1:
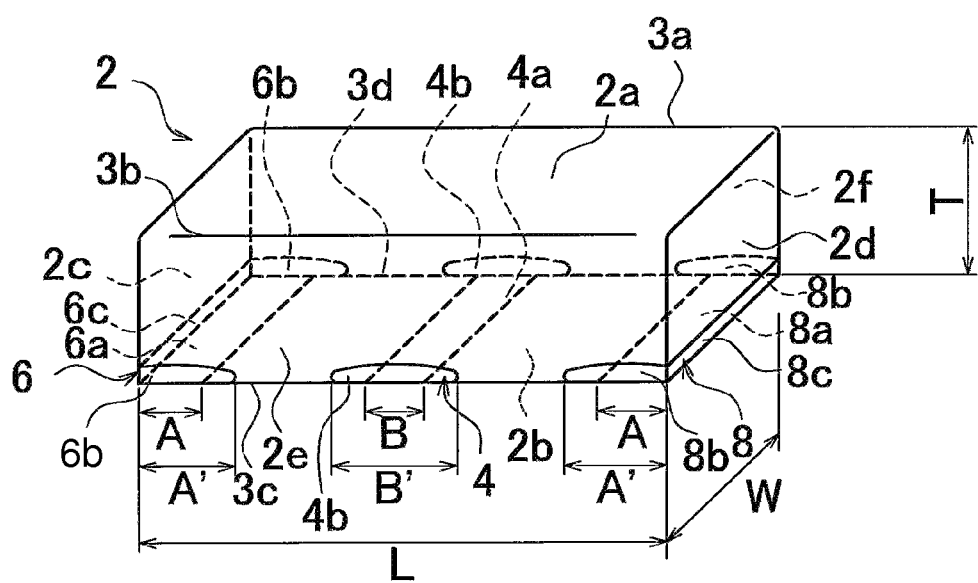
FIG. 1 is an appearance perspective view showing a multilayer ceramic electronic component according to a preferred embodiment of the present invention.
Figure 2:
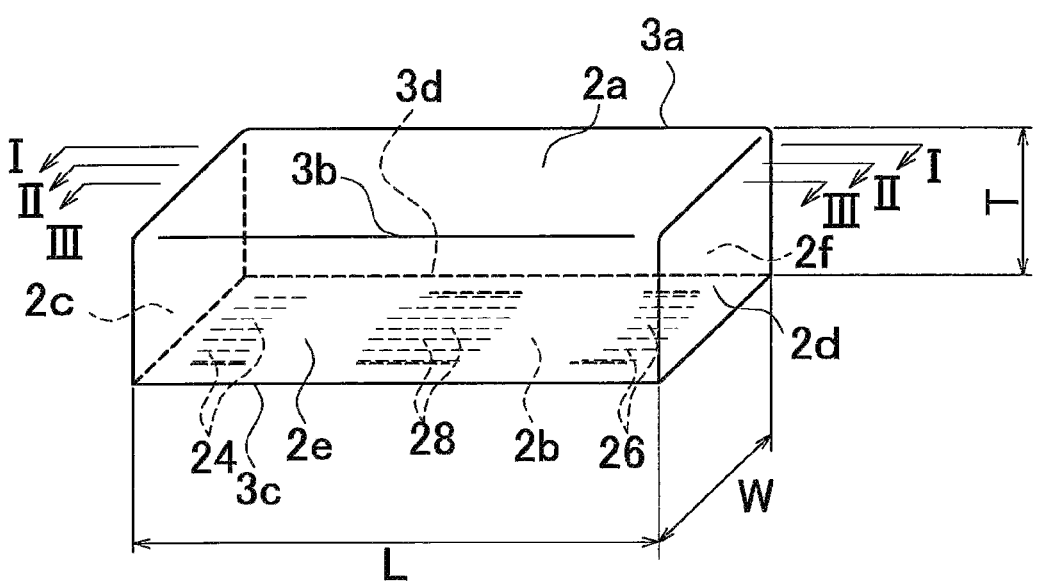
FIG. 2 is a perspective view of a multilayer ceramic element shown in FIG. 1.
Figure 3:
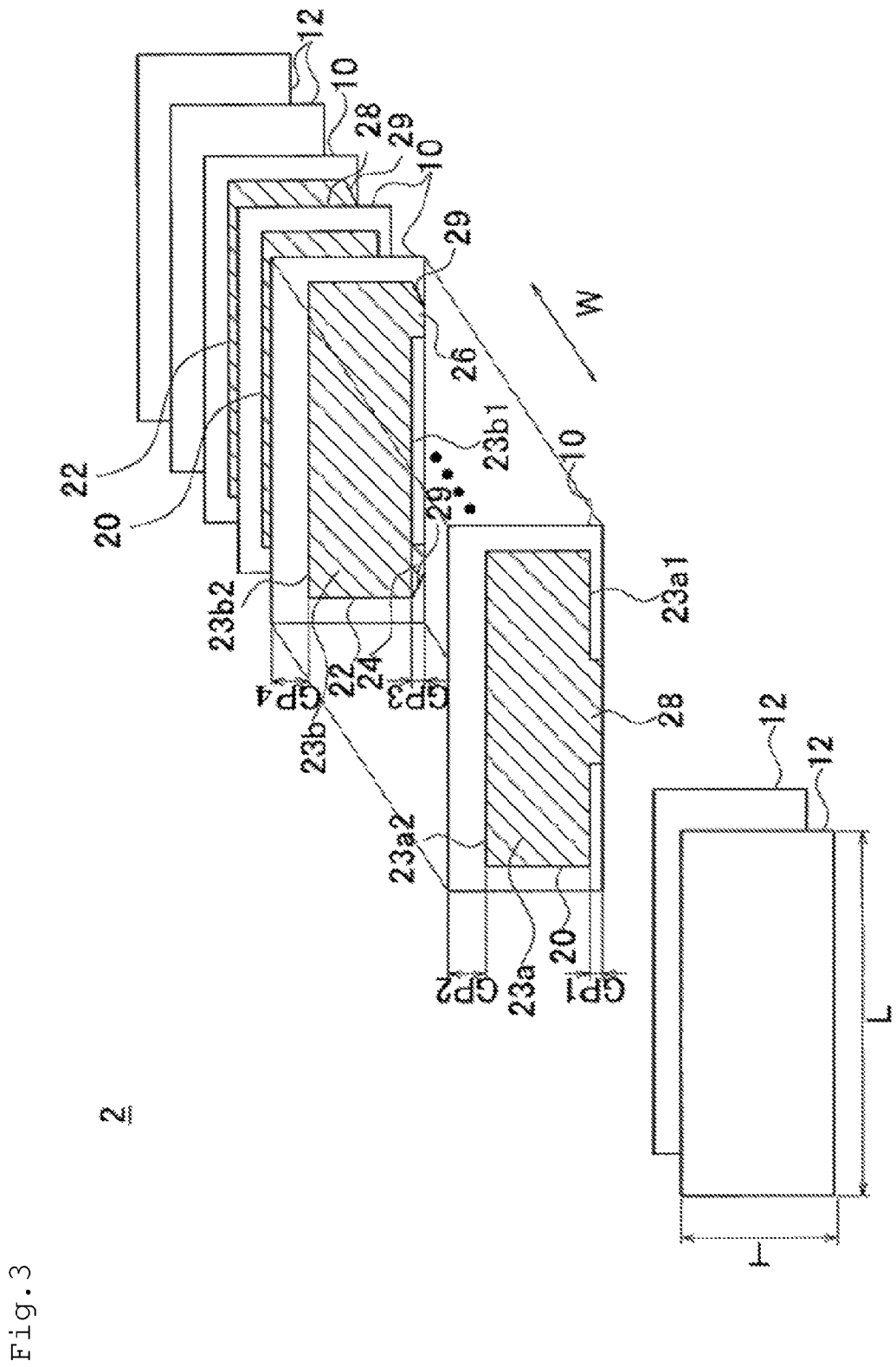
FIG. 3 is an exploded perspective view of the multilayer ceramic element shown in FIG. 2.
Figure 4:
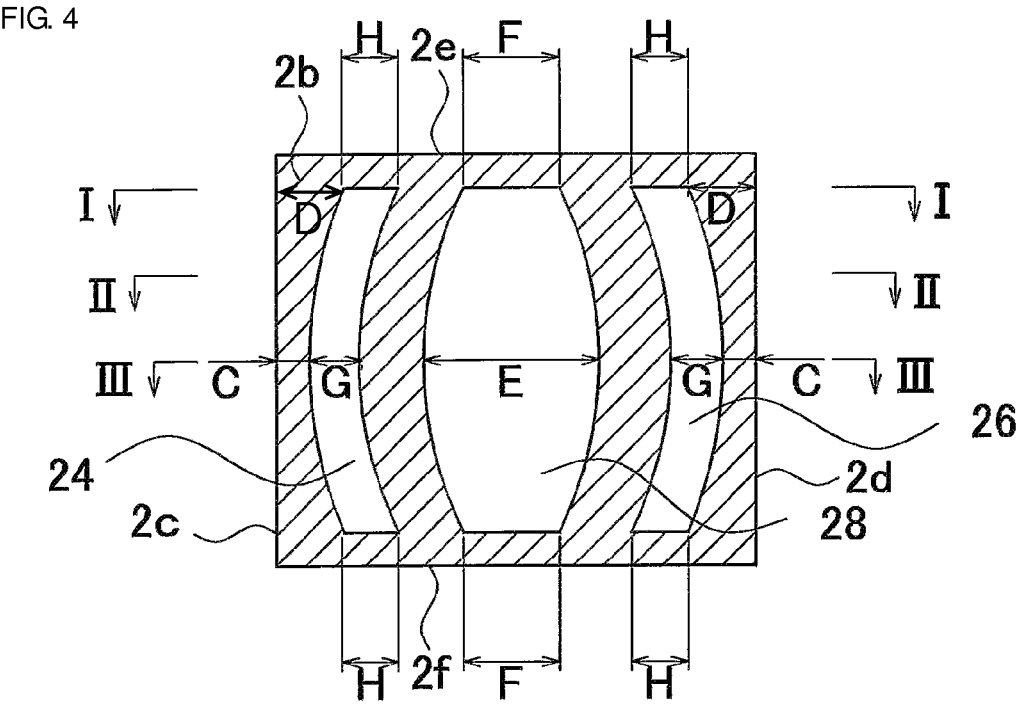
FIG. 4 is a schematic diagram showing extending portions of inner electrodes on an installation surface of the multilayer ceramic element shown in FIG. 2.
Figure 7:
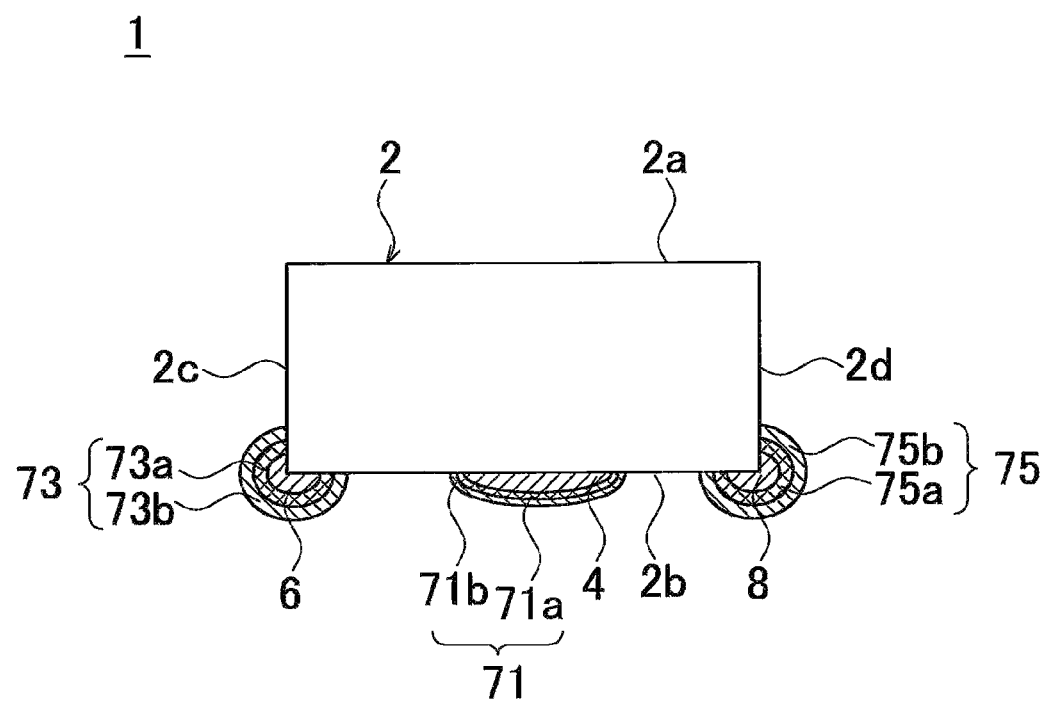
FIG. 7 is a schematic vertical cross-sectional view of the multilayer ceramic electronic component shown in FIG. 1.

FIG. 1 is an appearance perspective view showing a multilayer ceramic capacitor as a multilayer ceramic electronic component. FIG. 2 is a perspective view of the multilayer ceramic element shown in FIG. 1. FIG. 3 is an exploded perspective view of the multilayer ceramic element shown in FIG. 2. FIG. 4 is a schematic diagram showing extending portions of inner electrodes on an installation surface of the multilayer ceramic element shown in FIG. 2. FIG. 5 is an explanatory diagram illustrating a first inner electrode and a center extending portion, and FIG. 6 is an explanatory diagram illustrating second inner electrodes and a first-side extending portion and a second-side extending portion. FIG. 7 is a schematic vertical cross-sectional view of the multilayer ceramic electronic component shown in FIG. 1.

As shown in FIG. 1 or FIG. 2, a multilayer ceramic capacitor 1 includes a multilayer ceramic element 2 preferably with a rectangular or substantially rectangular parallelepiped shape. As shown in FIG. 1, the multilayer ceramic capacitor 1 includes a center outer electrode 4 provided on the center portion of an installation surface of the multilayer ceramic element 2, and side outer electrodes 6 and 8 provided on the right and left end portions of the installation surface of the multilayer ceramic element 2.

As shown in FIG. 1 and FIG. 2, the multilayer ceramic element 2 includes a first surface 2a and a second surface 2b, which faces the first surface 2a, in an upper-lower height direction T. In addition, the multilayer ceramic element 2 includes a third surface 2c and a fourth surface 2d, which faces the third surface 2c, in a right-left length direction L. Furthermore, the multilayer ceramic element 2 includes a fifth surface 2e and a sixth surface 2f, which faces the fifth surface 2e, in a front-back width direction W.

The multilayer ceramic capacitor 1 preferably has a dimension in the length direction L which is equal to or greater than about 2.00 mm and equal to or less than about 2.10 mm, a dimension in the height direction T which is equal to or greater than about 0.7 mm and equal to or less than about 1.0 mm, and a dimension in the width direction W which is equal to or greater than about 1.20 mm and equal to or less than about 1.40 mm, for example.

In addition, the dimension in the length direction L, the dimension in the thickness dimension T, and the dimension in the width direction W of the multilayer ceramic capacitor 1 can be measured by using a micrometer MDC-25MX manufactured by Mitutoyo Corporation.

As shown in FIG. 1, the center outer electrode 4 includes a center portion provided on a center area of the second surface 2b in the length direction L, an extension portion on the fifth surface 2e, and an extension portion on the sixth surface 2f. The side outer electrodes 6 and 8 are respectively provided on opposite end areas of the second surface 2b on the right and left sides so as to interpose the center outer electrode 4 therebetween. More specifically, the side outer electrode 6 extends across an end of the second surface 2b in the length direction L, the third surface 2c, the fifth surface 2e, and the sixth surface 2f. In addition, the side outer electrode 8 extends across the other end of the second surface 2b in the length direction L, the fourth surface 2d, the fifth surface 2e, and the sixth surface 2f.

Therefore, the second surface 2b is the installation surface of the multilayer ceramic capacitor 1. The multilayer ceramic capacitor 1 preferably is a three-terminal capacitor.

As shown in FIG. 7, the center outer electrode 4 preferably includes a thick film formed by applying outer electrode paste thereto once. In addition, the side outer electrodes 6 and 8 preferably include thick films formed by applying the outer electrode paste twice, respectively. Therefore, the electrode thickness of the side outer electrodes 6 and 8 is greater than the electrode thickness of the center outer electrode 4.

In addition, the thicknesses of the center outer electrode 4 and the side outer electrodes 6 and 8 can be measured by polishing the multilayer ceramic capacitor 1 from the fifth surface 2e toward the center in the width direction W to expose cross-sections of the center outer electrode 4 and the side outer electrodes 6 and 8, removing sag caused by the polishing, and observing the cross sections of the center outer electrode 4 and the side outer electrodes 6 and 8.

Here, a width B of a center main body 4a of the center outer electrode 4, which is shown in FIG. 1, preferably is set to be greater than a width A of the side main bodies 6a and 8a of the side outer electrodes 6 and 8, which are also shown in FIG. 1. More specifically, the width B of the center main body 4a of the center outer electrode 4 preferably is equal to or greater than about 0.63 mm and is equal to or less than about 0.67 mm, for example. The width A of the side main bodies 6a and 8a of the side outer electrodes 6 and 8 preferably is equal to or greater than about 0.35 mm and equal to or less than about 0.45 mm, for example.

In addition, the widths of the center outer electrode 4 and the side outer electrodes 6 and 8 can be measured by observing the first surface 2a or the second surface 2b of the multilayer ceramic capacitor 1 at 20-fold magnification with a measurement microscope MM-60 manufactured by Nikon Corporation.

When an outer electrode is formed by a roller transfer method or other suitable method, it is likely that the thickness of the outer electrode increases as the width of the outer electrode increases. Here, FIG. 8A is a diagram schematically showing a three-terminal multilayer ceramic capacitor 80 in the related art. If a width of a center outer electrode 82 provided at the center is greater than a width of the side outer electrodes 84a and 84b respectively provided on opposite end portions in the multilayer ceramic capacitor 80, the thickness of the center outer electrode 82 is also greater than the thicknesses of the side outer electrodes 84a and 84b, and the multilayer ceramic capacitor 80 cannot be mounted so as to be parallel with the installation board 90 as shown in FIG. 8A.

In contrast, if the side outer electrodes 6 and 8 are configured to have an electrode thickness which is greater than the electrode thickness of the center outer electrode 4, it is possible to mount the multilayer ceramic capacitor 1 so as to be parallel or substantially parallel with the installation board 90 as shown in FIG. 8B. As a result, it is possible to significantly reduce an apparent height of the multilayer ceramic capacitor 1 after the installation on the installation board 90.

In addition, since the electrode thickness of the side outer electrodes 6 and 8 is greater than the electrode thickness of the center outer electrode 4, and a self-alignment effect of the side outer electrodes 6 and 8 which are respectively provided on the opposite end portions of the multilayer ceramic element 2 is achieved, the multilayer ceramic capacitor 1 does not rotate about a position of the center outer electrode 4 and is capable of being stably installed without deviating from a regular installation position. Therefore, a phenomenon in which one of the side outer electrodes 6 and 8 provided on the second surface 2b (installation surface) is not electrically connected to the installation board 90, for example, does not occur. That is, all of the center outer electrode 4 and the side outer electrodes 6 and 8 provided on the second surface 2b (installation surface) are electrically connected to the installation board 90. Therefore, an increase in equivalent series inductance (ESL) after the installation of the multilayer ceramic capacitor 1 on the installation board 90 is significantly reduced or prevented.

As shown in FIG. 1 and FIG. 2, the center outer electrode 4 includes the center main body 4a which is electrically connected to center extending portions 28 of first inner electrodes 20 which will be described later, and a center extension body 4b which extends to opposite ends of the center main body 4a. In addition, the side outer electrode 6 includes the side main body 6a which is electrically connected to first-side extending portions 24 of second inner electrodes 22 as will be described later, a side extension body 6b which extends to opposite ends of the side main body 6a, and a third portion 6c which extends to an edge of the side main body 6a on one side. Similarly, the side outer electrode 8 includes the side main body 8a which is electrically connected to second-side extending portions 26 of second inner electrodes 22 as will be described later, a side extension body 8b which extends to opposite ends of the side main body 8a, and a third portion 8c which extends to an edge of the side main body 8a on the other side. The center main body 4a and the side main bodies 6a and 8a are provided on the second surface 2b, and the center extension body 4b and the side extension bodies 6b and 8b are provided on the fifth surface 2e and the sixth surface 2f, respectively. In addition, the third portion 6c is provided on the third surface 2c, and the third portion 8c is provided on the fourth surface 2d.

In addition, as shown in FIG. 1, a width B' of the center extension body 4b of the center outer electrode 4 is greater than the width B of the center main body 4a of the center outer electrode 4. Similarly, a width A' of the side extension bodies 6b and 8b of the side outer electrodes 6 and 8 is greater than the width of the side main bodies 6a and 8a of the side outer electrodes 6 and 8. That is, the width B' of the center extension body 4b of the center outer electrode 4 and the width A' of the side extension bodies 6b and 8b of the side outer electrodes 6 and 8 define a shape extended in the length direction L as compared with the width B of the center main body 4a of the center outer electrode 4 and the width A of the side main bodies 6a and 8a of the side outer electrodes 6 and 8.

Furthermore, the width B' of the center extension body 4b of the center outer electrode 4 is largest at a boundary portion 3c at which the second surface 2b and the fifth surface 2e intersect each other and at a boundary portion 3d at which the second surface 2b and the sixth surface 2f intersect each other. Similarly, the width A' of the side extension bodies 6b and 8b of the side outer electrodes 6 and 8 is largest at the boundary portion 3c at which the second surface 2b and the fifth surface 2e intersect each other and at the boundary portion 3d at which the second surface 2b and the sixth surface 2f intersect each other.

Figure 9A:
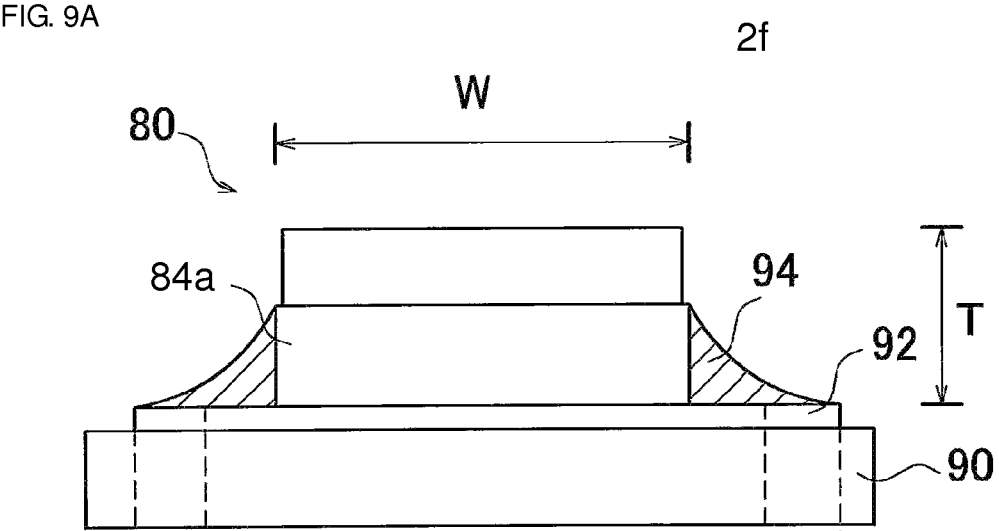
FIGS. 9A and 9B are explanatory diagrams illustrating another effect of the multilayer ceramic electronic component according to a preferred embodiment of the present invention.

Here, FIG. 9A is a diagram schematically showing the three-terminal multilayer ceramic capacitor 80 in the related art. If the three-terminal multilayer ceramic capacitor 80 in the related art is installed on a land 92 arranged on the installation board 90, it is necessary to secure wetting of solder to the multilayer ceramic capacitor 80 in order to secure fixing force between the multilayer ceramic capacitor 80 and the installation board 90 via the land 92. Therefore, a predetermined amount of solder is required in order to secure the fixing force between the multilayer ceramic capacitor 80 and the installation board 90 via the land 92.

Figure 9B:
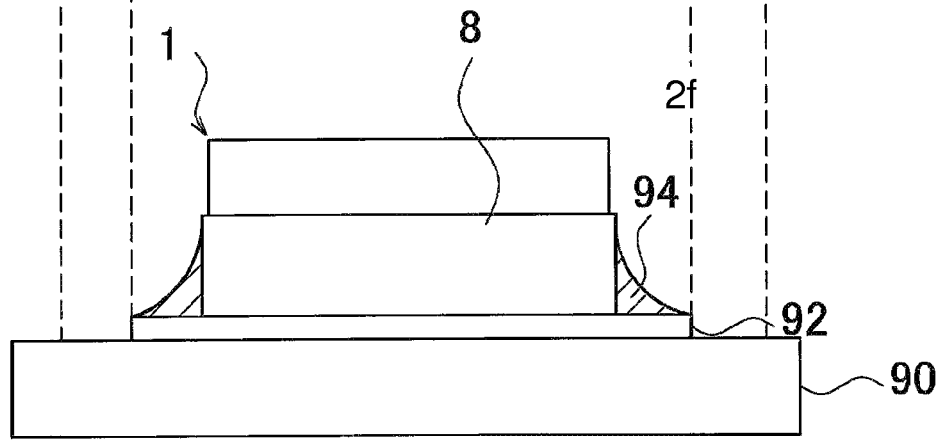

However, regarding the multilayer ceramic capacitor 1 as shown in FIG. 1, since the width B' of the center extension body 4b of the center outer electrode 4 preferably is greater than the width B of the center main body 4a of the center outer electrode 4, and the width A' of the side extension bodies 6b and 8b of the side outer electrodes 6 and 8 preferably is greater than the width A of the side main bodies 6a and 8a of the side outer electrodes 6 and 8, it is possible to increase the amounts of solder wetting up to the center extension body 4b of the center outer electrode and the side extension bodies 6b and 8b of the side outer electrodes 6 and 8 as compared with those in the related art. Accordingly, each land is preferably supplied with the same amount of the solder 94, it is possible to reduce an area of a fillet of solder 94 at the land 92 on the installation board 90 as compared with an area thereof in the related art while securing the fixing force between the multilayer ceramic capacitor 1 and the installation board 90 as shown in FIG. 9B. For this reason, it is possible to reduce an area for a pattern of the land 92 on the installation board 90 by installing the multilayer ceramic capacitor 1 on the installation board 90.

The center outer electrode 4 and the side outer electrodes 6 and 8 preferably are made of Ag, Cu, Ni, Pd, or an alloy thereof.

In addition, the center outer electrode 4 may be a ground side electrode while the side outer electrodes 6 and 8 are signal side electrodes, or alternatively, the center outer electrode 4 may be a signal side electrode while the side outer electrodes 6 and 8 are ground side electrodes.

Furthermore, a first plated film 71 is preferably provided on the surface of the center outer electrode 4 as shown in FIG. 7. The first plated surface 71 is configured of an Ni-plated film 71a and an Sn-plated film 71b provided on the Ni-plated film 71a. Second plated films 73 and 75 are preferably provided on the surfaces of the side outer electrodes 6 and 8, respectively. The second plated film 73 is configured of an Ni-plated film 73a and an Sn-plated film 73b provided on the Ni-plated film 73a. The second plated film 75 is configured of an Ni-plated film 73a and an Sn-plated film 75b provided on the Ni-plated film 75a. The Ni-plated films 71a, 73a, and 75a protect the center outer electrode 4 and the side outer electrodes 6 and 8, respectively. The Sn-plated films 71b, 73b, and 75b are provided for satisfactory solderability of the center outer electrode 4 and the side outer electrodes 6 and 8.

A film thickness of the second plated films 73 and 75 provided on the surface of the side outer electrodes 6 and 8 is preferably set to be greater than a film thickness of the first plated film 71 provided on the surface of the center outer electrode 4. That is, a film thickness of the Ni-plated films 73a and 75a of the second plated films 73 and 75 preferably is greater than a film thickness of the Ni-plated film 71 of the first plated film 71. A film thickness of the Sn-plated films 73b and 75b of the second plated films 73 and 75 preferably is greater than a film thickness of the Sn-plated film 71b of the first plated film 71. In addition, a sum of the electrode thickness of the side outer electrodes 6 and the film thickness of the second plated films 73, and a sum of the electrode thickness of the side outer electrodes 8 and the film thickness of the second plated films 75 preferably are greater than a sum of the electrode thickness of the center outer electrode 4 and the first plated film 71.

According to the present invention, the Sn plating is not necessarily provided.

More specifically, the film thickness of the Ni-plated film 71a of the first plated film 71 preferably is equal to or greater than about 2 μm and equal to or less than about 3 μm, and the film thickness of the Sn-plated film 71b preferably is equal to or greater than about 4 μm and equal to or less than about 5 μm, for example. Therefore, the film thickness of the first plated film 71 preferably is equal to or greater than about 6 μm and equal to or less than about 8 μm, for example. In contrast, the film thickness of the Ni-plated films 73a and 75a of the second plated films 73 and 75 preferably is equal to or greater than about 4 μm and equal to or less than about 5 μm, and the film thickness of the Sn-plated films 73b and 75b preferably is equal to or greater than about 5 μm and equal to or less than about 6 μm, for example. Therefore, the film thickness of each of the second plated films 73 and 75 preferably is equal to or greater than about 9 μm and equal to or less than about 11 μm, for example.

In addition, the thicknesses of the second plated films 73 and 75 and the first plated film 71 can be measured by polishing the multilayer ceramic capacitor 1 from the fifth surface 2e toward the center in the width direction W to expose cross sections of the second plated films 73 and 75 and the first plated surface 71, removing sag caused by the polishing, and observing the cross sections of the second plated films 73 and 75 and the first plated film 71.

Since the film thickness of the second plated films 73 and 75 on the surfaces of the side outer electrodes 6 and 8 is greater than the film thickness of the first plated film 71 formed on the surface of the center outer electrode 4 as described above, solder of the side outer electrodes 6 and 8 wets earlier than solder of the center outer electrode 4 at the time of the installation on the installation board 90. Therefore, the self-alignment effect of the side outer electrodes 6 and 8 which are respectively provided on the opposite end portions of the multilayer ceramic element 2 is achieved. For this reason, the multilayer ceramic capacitor 1 does not rotate about the position of the center outer electrode 4 and is capable of being stably installed without deviating from the regular installation position.

If the installation board is bent in the width direction W, stress is applied to the multilayer ceramic capacitor 1. The stress applied to the multilayer ceramic capacitor 1 easily concentrates on a portion of the multilayer ceramic element 2, which is in contact with an exposed end of the center extension body 4b of the center outer electrode 4 positioned on the fifth surface 2e and the sixth surface 2f. Therefore, cracking easily occurs in the multilayer ceramic element 2 from the portion of the multilayer ceramic element 2 which is in contact with the exposed end of the center extension body 4b of the center outer electrode 4 positioned on the fifth surface 2e and the sixth surface 2f.

Figure 10:
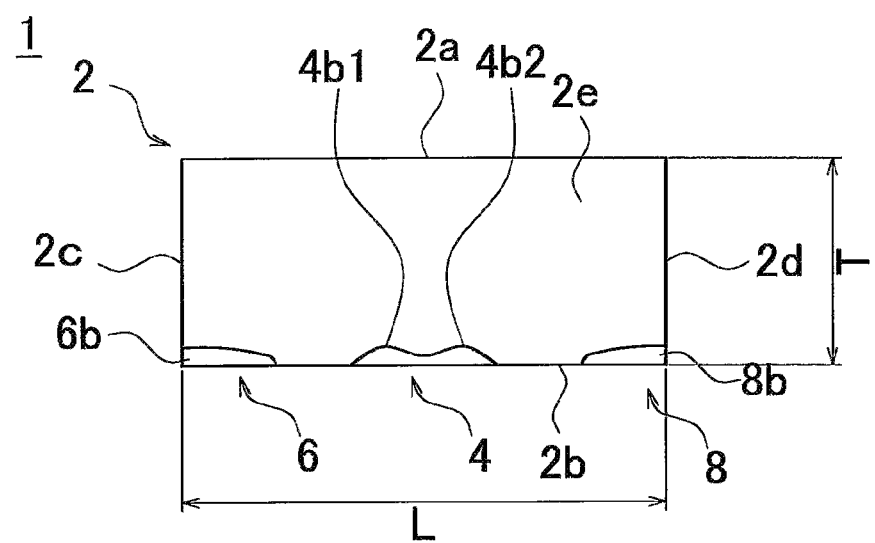
FIG. 10 is a schematic front view of a fifth surface in a modification example of the multilayer ceramic electronic component according to a preferred embodiment of the present invention.

FIG. 10 is a schematic front view of a fifth surface in a modification example of the multilayer ceramic electronic component according to a preferred embodiment of the present invention. In FIG. 10, the same reference numerals are given to the same components and portions as those in the multilayer ceramic capacitor 1 shown in FIG. 1, and the detailed descriptions thereof will be omitted.

In order to solve the above problem, the exposed end of the center extension body 4b may include a plurality of convex portions 4b1 and 4b2, which extend to a side of the first surface 2a, in the multilayer ceramic capacitor 1 as shown in FIG. 10. With such a configuration, the stress applied to the multilayer ceramic element 2 when the installation board is bent is dispersed to a plurality of portions where the convex portions 4b1 and 4b2 are positioned. Therefore, it is possible to significantly reduce or prevent concentration of large stress on a location in the multilayer ceramic element 2. As a result, it is possible to effectively significantly reduce or prevent occurrence of cracking in the multilayer ceramic element 2.

From the viewpoint of effectively reducing or preventing the occurrence of cracking in the multilayer ceramic element 2, the convex portions 4b1 and 4b2 preferably have curved edges when viewed from the width direction W.

In addition, the convex portions 4b1 and 4b2 can be measured by observing the fifth surface 2e or the sixth surface 2f of the multilayer ceramic element 2 at 20-fold magnification by the measurement microscope MM-60 manufactured by Nikon Corporation.

In addition, the outer electrodes can be formed by applying and fusing conductive paste, for example. In such a case, a center portion of each outer electrode in the width direction W is generally thickest due to influences of gravity force and surface tension. For this reason, the multilayer ceramic capacitor is inclined to one side or the other side in the width direction W by setting the center portion of each terminal electrode in the width direction W as a supporting point when the multilayer ceramic capacitor is installed. Therefore, an installation posture of the multilayer ceramic capacitor varies. If the installation posture of the multilayer ceramic capacitor varies, there is a concern in that characteristics of the multilayer ceramic capacitor after the installation vary.

Figure 11:
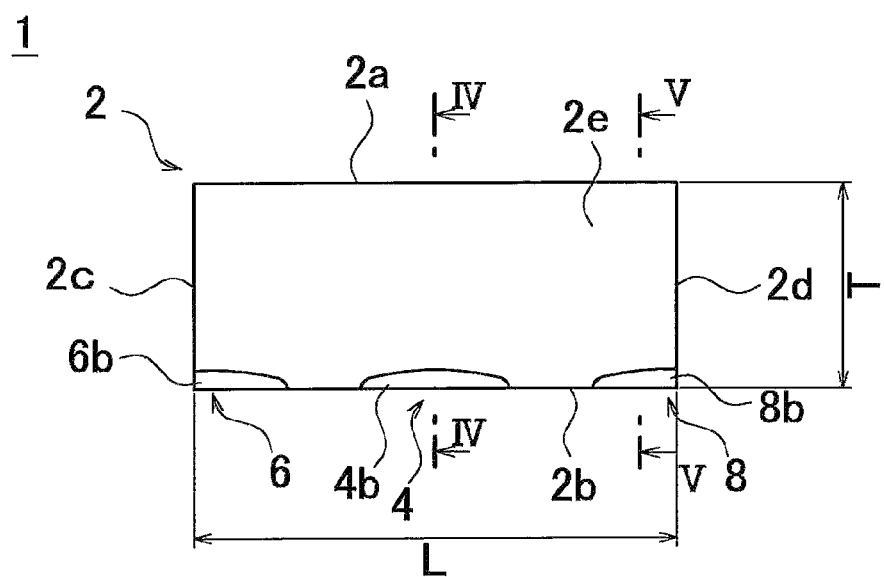
FIG. 11 is a schematic front view of a fifth surface in another modification example of the multilayer ceramic electronic component according to a preferred embodiment of the present invention.
Figure 12A:
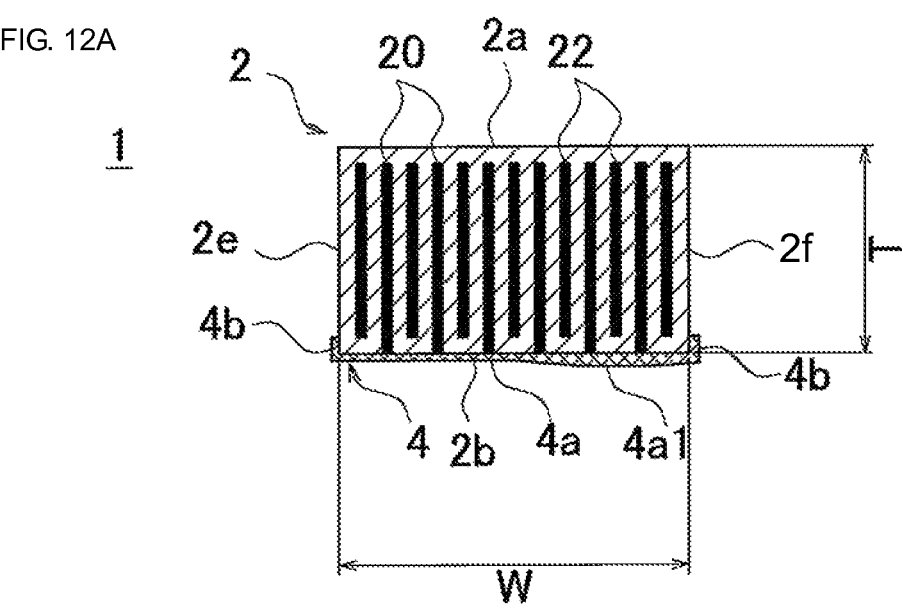
FIG. 12A is a schematic cross-sectional view taken along line IV-IV in FIG. 11.
Figure 12B:
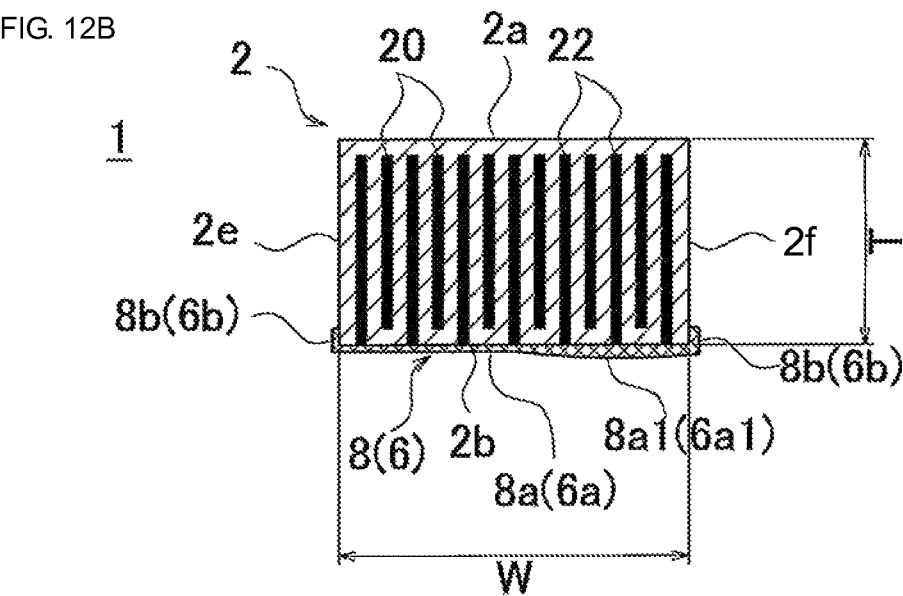
FIG. 12B is a schematic cross-sectional view taken along line V-V in FIG. 11.
Figure 13:
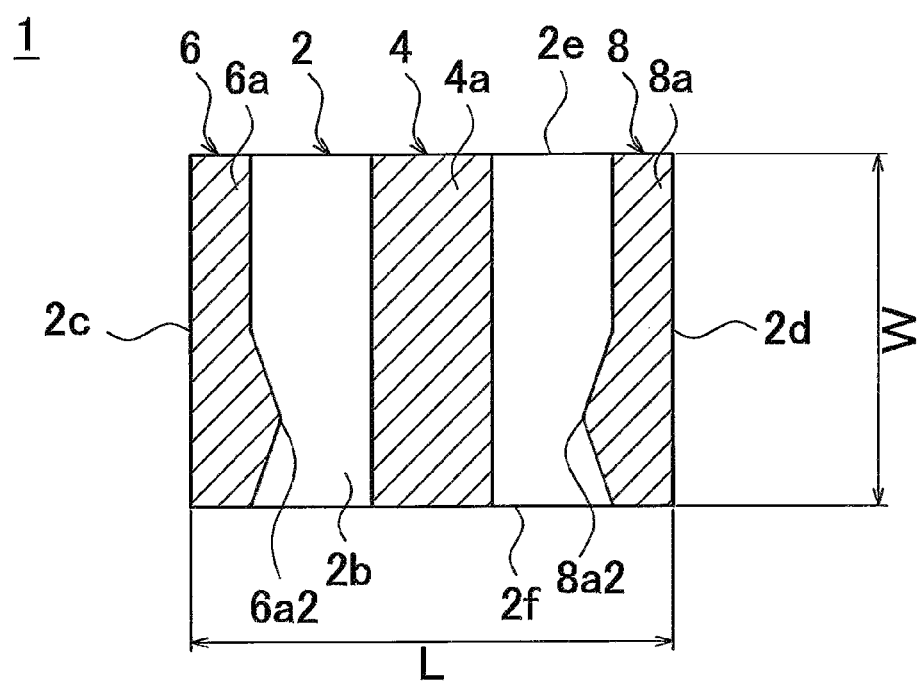
FIG. 13 is a schematic bottom view of the multilayer ceramic electronic component shown in FIG. 11.

FIG. 11 is a schematic front view of a fifth surface in another modification example of the multilayer ceramic electronic component according to a preferred embodiment of the present invention. In addition, FIG. 12A is a schematic cross-sectional view taken along line IV-IV in FIG. 11, and FIG. 12B is a schematic cross-sectional view taken along line V-V in FIG. 11. FIG. 13 is a schematic bottom view of the multilayer ceramic electronic component shown in FIG. 11. In FIGS. 11 to 13, the same reference numerals are given to the same components and portions as those in the multilayer ceramic capacitor 1 shown in FIGS. 1 to 3, and the detailed descriptions thereof will be omitted.

In order to solve the above problem, the center outer electrode 4 and the side outer electrodes 6 and 8 may respectively include the thickest portions at portions of the second surface 2b which are located at a different area than the center of the second surface 2b in the width direction of the center outer electrode 4 and the side outer electrodes 6 and 8, for example, which are located on the side of the sixth surface 2f in the width direction W as shown in FIGS. 12A and 12B. With such a configuration, the multilayer ceramic capacitor 1 is installed in a state where a total of six points, namely the thickest portions 4a1, 6a1, and 8a1 of the center main body 4a and the side main bodies 6a and 8a of the center outer electrode 4 and the side outer electrodes 6 and 8, which are positioned on the second surface 2b, on the side of the sixth surface 2f and the end portions of the center outer electrode 4 and the side outer electrodes 6 and 8 on the side of the fifth surface 2e are in contact with the installation board as shown in FIGS. 12A and 12B. Therefore, the multilayer ceramic capacitor 1 is capable of being installed in the stable installation state. As a result, it is possible to significantly reduce or prevent variations in the installation posture of the multilayer ceramic capacitor 1 and to significantly reduce or prevent variations in the characteristics of the multilayer ceramic capacitor 1 after the installation.

As for the thicknesses of the center outer electrode 4 and the side outer electrodes 6 and 8, the cross sections of the center outer electrode 4 and the side outer electrodes 6 and 8 are exposed by polishing the multilayer ceramic capacitor 1 from the fifth surface 2e toward the center in the width direction W. Then, it is possible to measure the thicknesses of the center outer electrode 4 and the side outer electrodes 6 and 8 by removing sag caused by the polishing and observing the cross sections by using a microscope.

Incidentally, if the installation board is bent in the length direction L, stress concentrates on contact portions between the second surface 2b and exposed ends of the side main bodies 6a and 8a of the side outer electrodes 6 and 8 in the length direction L. Therefore, cracking easily occurs in the multilayer ceramic element 2 from the contact points between the second surface 2b and the exposed ends of the side main bodies 6a and 8a of the side outer electrodes 6 and 8 in the length direction L as start points.

Thus, portions of the side outer electrodes 6 and 8 on at least the side of the sixth surface 2f in the width direction W may include bulge portions 6a2 and 8a2 which project toward the center outer electrode 4, namely toward the center in the length direction L in the multilayer ceramic capacitor 1 as shown in FIG. 13. The bulge portions 6a2 and 8a2 respectively include the thickest portions 6a1 and 8a1. With such a configuration, the stress applied to the multilayer ceramic element 2 at the contact portions between the exposed ends of the side main bodies 6a and 8a and the second surface 2b when the installation board is bent in the length direction L is dispersed in the width direction W. Therefore, the stress does not easily concentrate on a portion of the multilayer ceramic element 2. Accordingly, cracking does not easily occur in the multilayer ceramic element 2.

In addition, the center outer electrode 4 and the side outer electrodes 6 and 8 configured as described above can be formed by applying conductive paste and then drying the multilayer ceramic element in a state of being inclined such that the side of the sixth surface 2f is located on a lower side than the side of the fifth surface 2e in the width direction W, for example.

Figure 14:
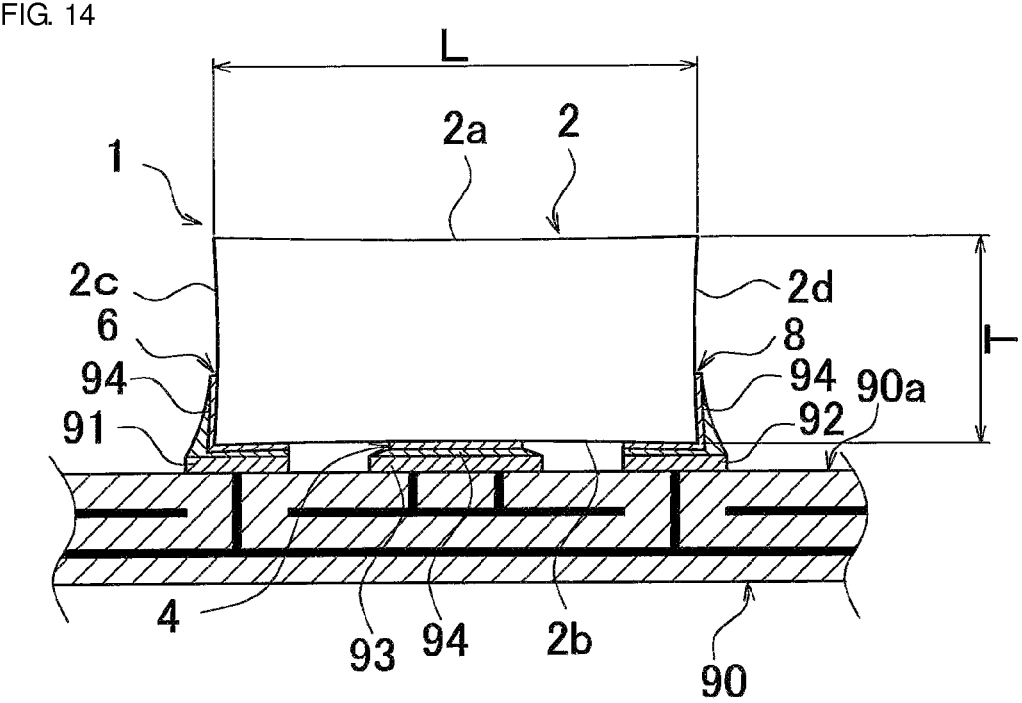
FIG. 14 is a schematic cross-sectional view showing an installation state of the multilayer ceramic electronic component.
Figure 15:
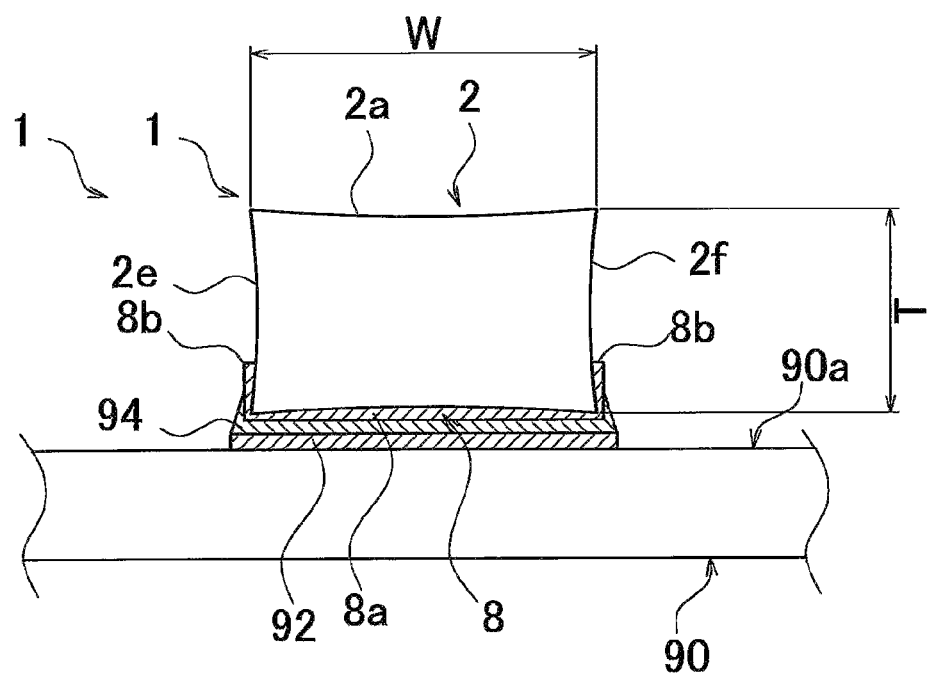
FIG. 15 is a schematic cross-sectional view showing an installation state of the multilayer ceramic electronic component.

FIGS. 14 and 15 are schematic cross-sectional views showing an installation state of the multilayer ceramic electronic component. The multilayer ceramic capacitor 1 is installed on an installation surface 90a of the installation board 90 with the solder 94. The installation board 90 includes first to third lands 91 to 93 provided on the installation surface 90a.

As shown in FIGS. 14 and 15, the second surface 2b, the third surface 2c, and the fourth surface 2d are concave surfaces. Specifically, the second surface 2b which faces the installation surface 90a is depressed on the side of the first surface 2a from ends thereof in the length direction L to the center and is depressed on the side of the first surface 2a from the ends thereof in the width direction W toward the center.

For this reason, if all the center outer electrode 4 and the side outer electrodes 6 and 8 have the same thickness, for example, a distance between the center outer electrode 4, which is positioned at the center in the length direction L, and the third land 93 is longer than a distance between the side outer electrode 6 and the first land 91 and a distance between the side outer electrode 8 and the second land 92. Therefore, there is a concern in that connection between the center outer electrode 6 and the third land 93 is not reliably established or electrical resistance increases.

In the multilayer ceramic capacitor 1, the thickest portions of the center outer electrode 4 in the width direction W may be thicker than the thickest portions of the side outer electrodes 6 and 8 in the width direction W. With such a configuration, it is possible to shorten the distance between the center outer electrode 4 and the third land 93. Accordingly, it is possible to reliably connect the center outer electrode 4 to the third land 93 and to reduce the electrical resistance between the center outer electrode 4 and the third land 93. That is, the multilayer ceramic capacitor 1 exhibits an excellent installation property.

In addition, the thickest portion of the center outer electrode 4 in the width direction W can be checked by measuring a thickness of a cross section which appears after polishing the multilayer ceramic capacitor 1 from the third surface 2c or the fourth surface 2d toward the center outer electrode 4.

Moreover, the thickest portion of the side outer electrode 6 in the width direction W can be checked by measuring a thickness of a cross section which appears after polishing the multilayer ceramic capacitor 1 from the third surface 2c toward the side outer electrode 6.

Furthermore, the thickest portion of the side outer electrode 8 in the width direction W can be checked by measuring a thickness of a cross section which appears after polishing the multilayer ceramic capacitor 1 from the fourth surface 2d toward the side outer electrode 8.

The first surface 2a as an upper surface of the multilayer ceramic capacitor 1 is polished such that corner portions of the ridge portions 3a and 3b in the length direction L are rounded, and a curvature radius thereof (hereinafter, also referred to as an R amount) is equal to or less than about 70 µm, for example. In addition, the R amount is preferably equal to or greater than about 30 µm and equal to or less than about 70 µm, for example.

Since the R amount of the ridge portions 3a and 3b of the upper surface (first surface 2a) of the multilayer ceramic capacitor 1 in the length direction L preferably is equal to or less than about 70 µm as described above, an adsorption area required for the adsorption by the adsorption nozzle is reliably secured on the upper surface (first surface 2a). As a result, the adsorption nozzle easily adsorbs the upper surface (first surface 2a) of the multilayer ceramic capacitor 1 at the time of the installation on the installation board, and it is possible to reduce adsorption errors by the adsorption nozzle.

In addition, if the R amount of the ridge portions 3a and 3b of the upper surface (first surface 2a) of the multilayer ceramic capacitor 1 in the length direction L is equal to or greater than about 30 µm, for example, the ridge portions 3a and 3b do not become angular, and a failure such as chipping-off of the ridge portions 3a and 3b does not easily occur even if mechanical impact is applied to the ridge portions 3a and 3b.

As shown in FIG. 3, the multilayer ceramic element 2 preferably includes a multilayer body structure configured of a plurality of ceramic layers as inner layers 10, a plurality of first inner electrodes 20 and second inner electrodes 22 which are disposed at boundary surfaces between the plurality of ceramic layers 10 as inner layers, and ceramic layers 12 as outer layers which are disposed before and after the plurality of ceramic layers 10 as inner layers so as to interpose the plurality of ceramic layers 10 as inner layers therebetweeen.

Each of the first inner electrodes 20 includes a first facing portion 23a and a center extending portion 28 which extend downward in the height direction T from a center portion of the first facing portion 23a. The center extending portion 28 extends to the center portion of the second surface 2b of the multilayer ceramic element 2 and is electrically connected to the center main body 4a of the center outer electrode 4.

In addition, a gap GP1 is provided between a first edge 23a1 of the facing portion 23a of each first inner electrode 20 on the side of the second surface 2b and the second surface 2b of the multilayer ceramic element 2. Moreover, a gap GP2 is provided between a second edge 23a2 of the facing portion 23a of each first inner electrode 20 on the side of the first surface 2a and the first surface 2a of the multilayer ceramic element 2. The gap GP1 preferably is set to be smaller than the gap GP2. The gap GP1 and the gap GP2 are compared by polishing the multilayer ceramic capacitor 1 in the width direction W (lamination direction) and observing an inner electrode which appears after the polishing at 20-fold magnification by MM-60 manufactured by Nikon Corporation. In addition, GP1 preferably is equal to or greater than about 0.049 mm and equal to or less than about 0.055 mm, and GP2 preferably is equal to or greater than about 0.056 mm and equal to or less than about 0.063 mm, for example.

The second inner electrode 22 includes a second facing portion 23b, a first-side extending portion 24 which extends downward in the height direction T from a left end portion of the second facing portion 23b, and a second-side extending portion 26 which extends downward in the height direction T from a right end portion of the second facing portion 23b. The first-side extending portion 24 extends to a left end portion of the second surface 2b of the multilayer ceramic element 2 and is electrically connected to the side main body 6a of the side outer electrode 6. The second-side extending portion 26 extends to a right end portion of the second surface 2b of the multilayer ceramic element 2 and is electrically connected to the side main body 8a of the side outer electrode 8.

In addition, as shown in FIG. 3, a gap GP3 is provided between a first edge 23b1 of the facing portion 23b of each second inner electrode 22 on the side of the second surface 2b and the second surface 2b of the multilayer ceramic element 2. Moreover, a gap GP4 is provided between a second edge 23b2 of the facing portion 23b of each second inner electrode 22 on the side of the first surface 2a and the first surface 2a of the multilayer ceramic element 2. The gap GP3 preferably is set to be smaller than the gap GP4. The gap GP3 and the gap GP4 are compared by polishing the multilayer ceramic capacitor 1 in the width direction W (lamination direction) and observing an inner electrode which appears after the polishing at 20-fold magnification by MM-60 manufactured by Nikon Corporation.

As described above, the gap GP1 provided between the first edge 23a1 of the facing portion 23a of each first inner electrode 20 on the side of the second surface 2b and the second surface 2b of the multilayer ceramic element 2 is preferably set to be smaller than the gap GP2 provided between the second edge 23a2 of the facing portion 23a of each first inner electrode 20 on the side of the first surface 2a and the first surface 2a of the multilayer ceramic element 2, and the gap GP3 provided between the first edge 23b1 of the facing portion 23b of each second inner electrode 22 on the side of the second surface 2b and the second surface 2b of the multilayer ceramic element 2 preferably is set to be smaller than the gap GP4 provided between the second edge 23b2 of the facing portion 23b of each second inner electrode 22 on the side of the first surface 2a and the first surface 2a of the multilayer ceramic element 2. Therefore, it is possible to avoid a problem in which the inner electrodes are exposed due to chipping off or breakage caused by mechanical impact applied to the first surface of the multilayer ceramic element 2 or in the ridge portions, the corner portions, or the like of the first surface 2a. As a result, it is possible to improve reliability of the multilayer ceramic capacitor as an electronic component.

Figure 16A:
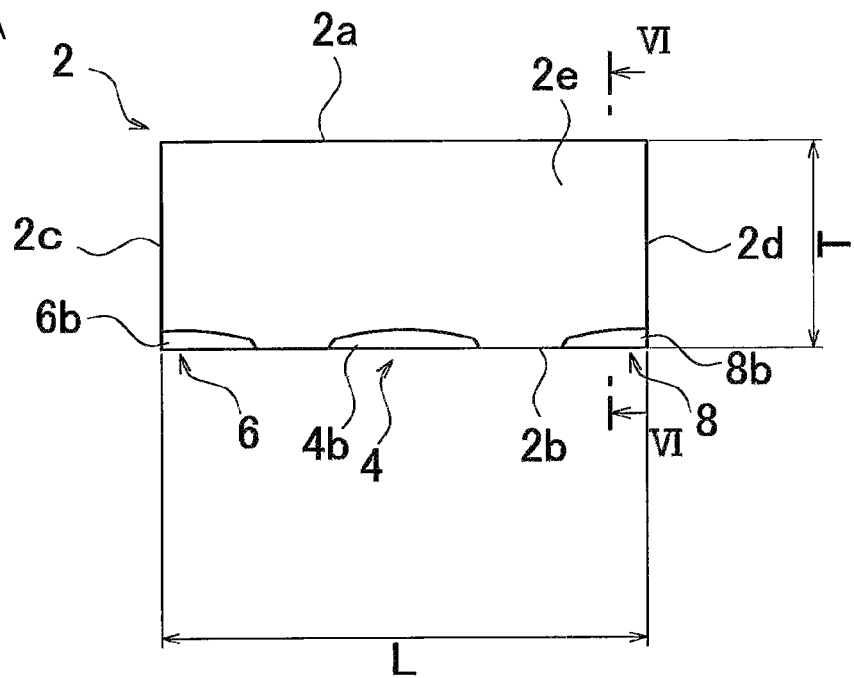
FIG. 16A is a schematic front view of a fifth surface in still another modification example of the multilayer ceramic electronic component according to a preferred embodiment of the present invention.
Figure 16B:
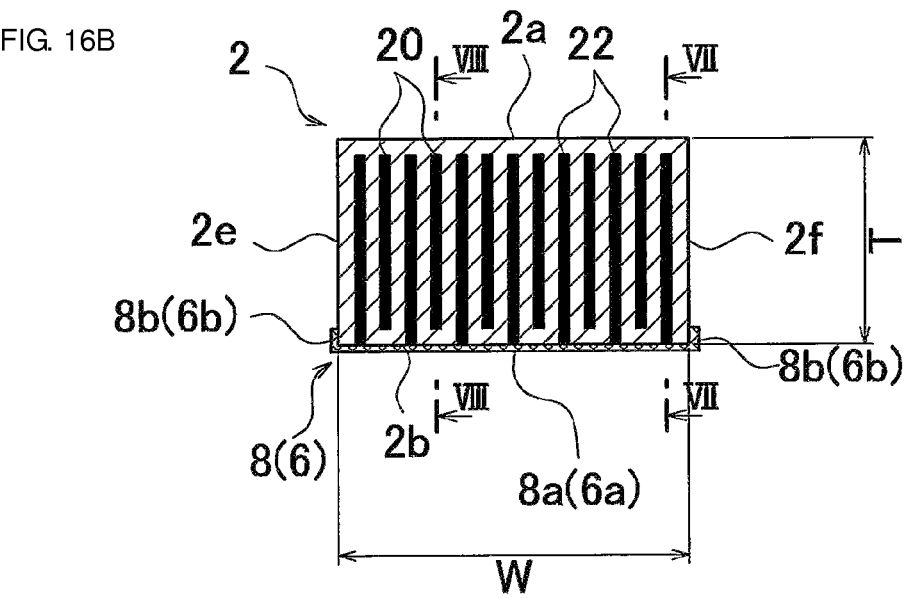
FIG. 16B is a schematic cross-sectional view taken along line VI-VI in FIG. 16A.
Figure 17A:
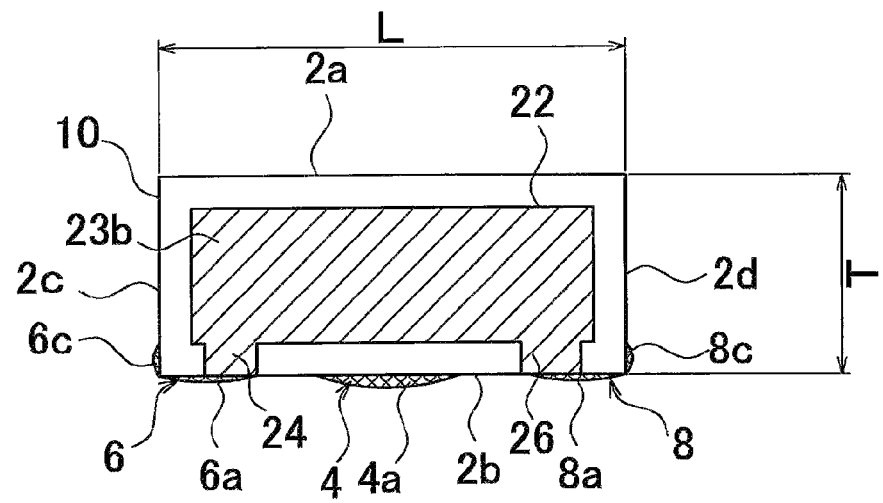
FIG. 17A is a schematic cross-sectional view taken along line VII-VII in FIG. 16B.
Figure 17B:
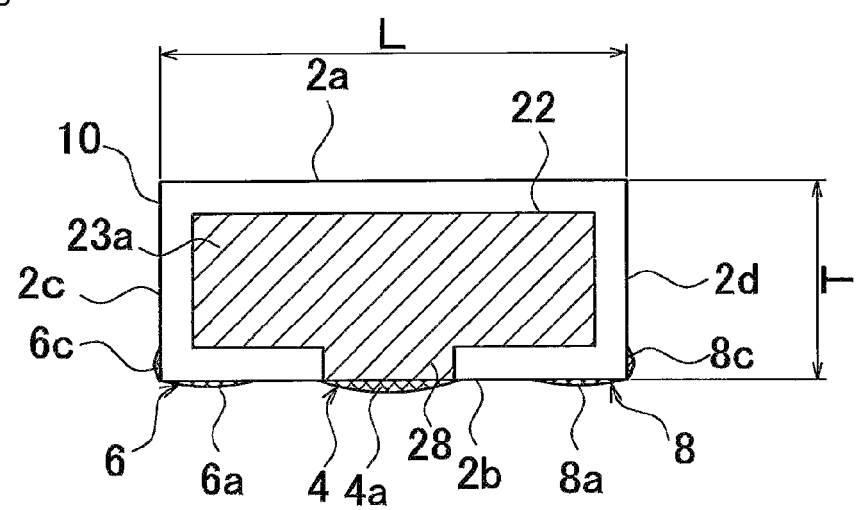
FIG. 17B is a schematic cross-sectional view taken along line VIII-VIII in FIG. 16B.

Here, FIG. 16A is a schematic front view of a fifth surface in still another modification example of the multilayer ceramic electronic component according to a preferred embodiment of the present invention, and FIG. 16B is a schematic cross-sectional view taken along line VI-VI in FIG. 16A. FIG. 17A is a schematic cross-sectional view taken along line VII-VII in FIG. 16B, and FIG. 17B is a schematic cross-sectional view taken along line VIII-VIII in FIG. 16B. In FIGS. 16A, 16B, 17A, and 17B, the same reference numerals are given to the same components and portions as those in the multilayer ceramic capacitor 1 shown in FIGS. 1 to 3, and detailed descriptions thereof will be omitted.

As shown in FIG. 17A, the side main body 6a becomes thinner toward outer side portions in the length direction L (both directions toward the side of the third surface 2c and the side of the fourth surface 2d in the length direction L). Similarly, the side main body 8b becomes thinner toward outer side portions in the length direction L (both directions toward the side of the third surface 2c and the side of the fourth surface 2d in the length direction L).

In the multilayer ceramic capacitor 1, the first-side extending portion 24 and the second-side extending portion 26 of each second inner electrode 22 are overlapped with the thickest portions of the side outer electrodes 6 and 8, which have an excellent sealing property against moisture, in the length direction L. Therefore, moisture does not easily enter each second inner electrode 22. Accordingly, the multilayer ceramic capacitor 1 exhibits excellent moisture resistance.

Incidentally, it is necessary to arrange the first-side extending portion 24 and the second-side extending portion 26 at inner side portions to some extent in the L direction in order to provide the first-side extending portion 24 and the second-side extending portion 26 such that the first-side extending portion 24 and the second-side extending portion 26 of each second inner electrode 22 are overlapped with the thickest portions of the side outer electrodes 6 and 8, which have the excellent sealing property against moisture, in the length direction L. If each inner electrode is provided such that edges of the outer side portions of the extending portions and edges of the outer side portions of the facing portion are linearly positioned in this case as disclosed in Japanese Unexamined Patent Application Publication No. 2013-46052, an area where the inner electrodes face each other decreases. Therefore, there is a problem in which large capacitance cannot be secured if it is attempted to improve the moisture resistance in the capacitor disclosed in Japanese Unexamined Patent Application Publication No. 2013-46052.

Thus, in order to solve the above problem, the second facing portion 23b preferably is configured so as to reach the outer side portion beyond the first-side extending portion 24 in the length direction L (on the side of the third surface 2c in the length direction L) and to reach the outer side portion beyond the second-side extending portion 26 in the length direction L (on the side of the fourth surface 2d in the length direction L). With such a configuration, it is possible to increase the area of the second facing portion 23b. Therefore, it is possible to increase the area where each first inner electrode 20 faces each second inner electrode 22 in the multilayer ceramic capacitor 1 as described above. Accordingly, it is possible to increase the capacitance of the multilayer ceramic capacitor 1. With such a configuration, it is possible to cause the multilayer ceramic capacitor 1 to have large capacitance and excellent moisture resistance.

Specifically, if the multilayer ceramic capacitor 1 which includes the side outer electrodes 6 and 8 and the center outer electrode 4 provided therein has a dimension in the length direction L equal to or greater than about 2.00 mm and equal to or less than about 2.10 mm, a dimension in the height direction T equal to or greater than about 0.7 mm and equal to or less than about 1.0 mm, and a dimension in the width direction W equal to or greater than about 1.20 mm and equal to or less than about 1.40 mm, it is possible to obtain electrostatic capacitance of equal to or greater than about 47.0 µF and equal to or less than about 48.0 µF, for example.

In addition, it is preferable that a portion of the second facing portion 23b, which reaches the outer side portion beyond the first-side extending portion 24 in the length direction L, at which the length direction L and the height direction T orthogonally intersect each other, be chamfered and that the length from the exposed end of the second facing portion 23b on the side of the third surface 2c to the end portion of the first-side extending portion 24 on the side of the third surface 2c be equal to or greater than about 40 µm and equal to or less than about 60 µm, for example. It is preferable that a portion of the second facing portion 23b, which reaches the outer side portion beyond the first-side extending portion 24 in the length direction L, at which the length direction L and the height direction T orthogonally intersect each other, be chamfered and that the length from the exposed end of the second facing portion 23b on the side of the fourth surface 2d to the end portion of the second-side extending portion 26 on the side of the fourth surface 2d be equal to or greater than about 40 µm and equal to or less than about 60 µm, for example.

The length from the exposed end of the second facing portion 23b on the side of the third surface 2c to the end portion of the first-side extending portion 24 on the side of the third surface 2c and the length from the exposed end of the second facing portion 23 on the side of the fourth surface 2d to the end portion of the second-side extending portion 26 on the side of the fourth surface 2d can be measured by polishing the multilayer ceramic capacitor 1 from the fifth surface 2e or the sixth surface 2f toward the center portion of the multilayer ceramic capacitor 1 and observing an inner electrode which appears after the polishing at 20-fold magnification by MM-60 manufactured by Nikon Corporation.

In addition, the electrostatic capacitance can be measured by a measurement instrument HP4268A manufactured by Agilent Technologies under conditions of 120 Hz and 0.5 Vrms.

(I) of FIG. 5 shows each first inner electrodes 20 and the center extending portion 28 at position I-I (a position at or near the outermost layer of the multilayer ceramic element 2) in FIG. 1. (II) of FIG. 5 shows each first inner electrode 20 and the center extending portion 28 at position II-II (a position in the vicinity of a layer (hereinafter, referred to as a quarter layer) disposed at a position corresponding to a width W of ¼ from the outermost layer of the multilayer ceramic element 2) in FIG. 1. (III) of FIG. 5 shows each first inner electrode 20 and the center extending portion 28 at position III (a position in the vicinity of a layer (hereinafter, referred to as a center layer) disposed at a position corresponding to a width W of about ½ from the outermost layer of the multilayer ceramic element 2) in FIG. 1.

A width E of a exposed end of the center extending portion 28 of the first inner electrode 20 disposed at or near the center layer of the multilayer ceramic element 2 preferably is set to be greater than a width F of a exposed end of the center extending portion 28 of the first inner electrode 20 disposed at or near the outermost layer of the multilayer ceramic element 2. In addition, widths of the exposed ends of the center extending portions 28 gradually increase from the position at or near the outermost layer toward the position in the vicinity of the center layer.

(I) of FIG. 6 shows the each second inner electrode 22, the first-side extending portion 24, and the second-side extending portion 26 at the position I-I in FIG. 1. (II) of FIG. 6 shows each second inner electrode 22, the first-side extending portion 24 and the second-side extending portion 26 at the position II-II in FIG. 1. (III) of FIG. 6 shows each second inner electrode 22, the first-side extending portion 24, and the second-side extending portion 26 at the position III-III in FIG. 1.

A width G of exposed ends of the first-side extending portion 24 and the second-side extending portion 26 of the second inner electrode 22 disposed at or near the center layer of the multilayer ceramic element 2 preferably is set to be greater than a width H of exposed ends of the first-side extending portion 24 and the second-side extending portion 26 of the second inner electrode 22 disposed at or near the outermost layer of the multilayer ceramic element 2. In addition, widths of the exposed ends of the first-side extending portions 24 and the second-side extending portions 26 gradually increase from the position at or near the outermost layer to the position at or near the center layer.

Furthermore, the exposed end of the first-side extending portion 24 of the second inner electrode 22 disposed at or near the center layer of the multilayer ceramic element 2 is separate from the third surface (end surface) 2c of the multilayer ceramic element 2 by a distance C as shown in FIG. 4. Similarly, the exposed end of the second-side extending portion 26 of the second inner electrode 22 disposed at or near the center layer of the multilayer ceramic element 2 is also separate from the fourth surface (end surface) 2d of the multilayer ceramic element by the distance C. In addition, the exposed end of the first-side extending portion 24 of the second inner electrode 22 disposed at or near the outermost layer of the multilayer ceramic element 2 is separate from the third surface 2c of the multilayer ceramic element 2 by a distance D. Similarly, the exposed end of the second-side extending portion 26 of the second inner electrode 22 disposed at or near the outermost layer of the multilayer ceramic element 2 is also separate from the fourth surface 2d of the multilayer ceramic element 2 by the distance D. Moreover, the distance D preferably is set to be greater than the distance C.

In addition, the distance C preferably is equal to or greater than about 0.085 mm and equal to or less than about 0.097 mm, and the distance D preferably is equal to or greater than about 0.098 mm and equal to or less than about 0.140 mm, for example.

Here, in order to set the distance D to be greater than the distance C, the first-side extending portions 24 and the second-side extending portions 26 of the second inner electrodes disposed in the vicinity of the outermost layer of the multilayer ceramic element 2 have inclined portions 29, and positions of the exposed ends thereof are close to the center. In addition, the positions of the exposed ends are located at gradually outer side portions from the position at or near the outermost layer toward the position at or near the center layer by increasing inclination angles of the inclined portions 29 of the first-side extending portions 24 and the second-side extending portions 26.

Table 1 shows an example of specific numerical values for distances between the exposed ends of the first-side extending portions 24 (second-side extending portions 26) and the third surface 2c (fourth surface 2d) of the multilayer ceramic element 2, widths of the exposed ends of the first-side extending portions 24 and the second-side extending portions 26, and widths of the exposed ends of the center extending portions 28 at the position I-I (the position in the vicinity of the outermost layer), at the position II-II, and at the position III-III (the position in the vicinity of the center layer). In addition, α in Table 1 is a numerical value which is equal to the distance C between the exposed end of the first-side extending portion 24 (second-side extending portion 26) in the vicinity of the center layer and the third surface 2c (fourth surface 2d) of the multilayer ceramic element 2.

TABLE 1

| | Distance from exposed end of first-side extending portion (second-side extending portion) to end surface of multilayer ceramic element | Length of exposed end of first-side extending portion (second-side extending portion) | Length of exposed end of center extending portion |
|---|---|---|---|
| Position I-I | α + 40 μm (=D) | 230 μm (=H) | 460 μm (=F) |
| Position II-II | α + 20 μm | 240 μm | 480 μm |
| Position III-III | α μm (=C) | 250 μm (=G) | 500 μm (=E) |

Since the distance D preferably is set to be greater than the distance C as described above, it is possible to obtain a multilayer ceramic capacitor 1 in which cracking does not easily occur at or near the outermost layer of the multilayer ceramic element 2.

In addition, since the length G of the exposed ends of the first-side extending portion 24 and the second-side extending portion 26 of the second inner electrode 22 disposed at or near the center layer of the multilayer ceramic element 2 preferably is set to be greater than the length H of the exposed ends of the first-side extending portion 24 and the second-side extending portion 26 of the second inner electrode 22 in the vicinity of the outermost layer of the multilayer ceramic element 2, the occurrence of cracking in the vicinity of the outermost layer of the multilayer ceramic element 2 is further prevented.

Furthermore, since the length E of the exposed end of the center extending portion 28 of the first inner electrode 20 disposed at or near the center layer of the multilayer ceramic element 2 preferably is set to be greater than the length F of the exposed end of the center extending portion 28 of the first inner electrode 20 disposed in the vicinity of the outermost layer of the multilayer ceramic element 2, an electrical distance between the center outer electrode 4 and the side outer electrodes 6 and 8 at or near the center layer of the multilayer ceramic element 2 is shortened and becomes equal or substantially equal to an electrical distance between the center outer electrode 4 and the side outer electrodes 6 and 8 at or near the outermost layer of the multilayer ceramic element 2. As a result, equivalent series inductance (ESL) is significantly reduced and made uniform or substantially uniform.

Incidentally, the moisture resistance of the multilayer ceramic capacitor depends on how easily moisture can enter the facing portions of the inner electrodes. If moisture can easily enter the facing portions of the inner electrodes, the moisture resistance of the multilayer ceramic capacitor deteriorates. Therefore, it is necessary to make it difficult for moisture to enter the facing portions of the inner electrodes in order to enhance the moisture resistance of the multilayer ceramic capacitor. As a method of making it difficult for moisture to enter the facing portions, a method of extending the lengths of the extending portions can be considered, for example. However, the areas of the facing portions decrease if the lengths of the extending portion increase, and the capacitance tends to decrease.

Figure 18A:
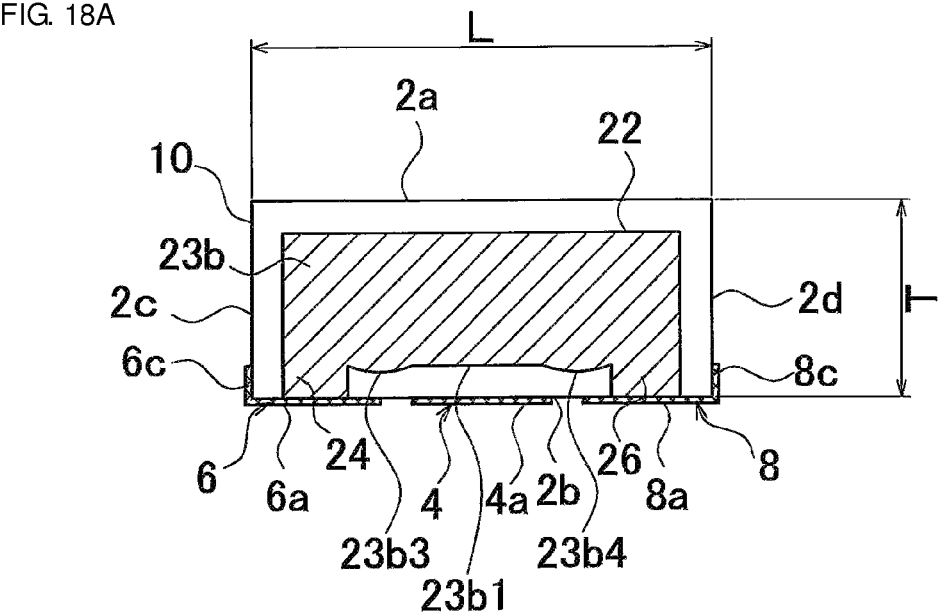
FIGS. 18A and 18B are schematic cross-sectional views of still another modification example of the multilayer ceramic electronic component according to a preferred embodiment of the present invention.
Figure 18B:
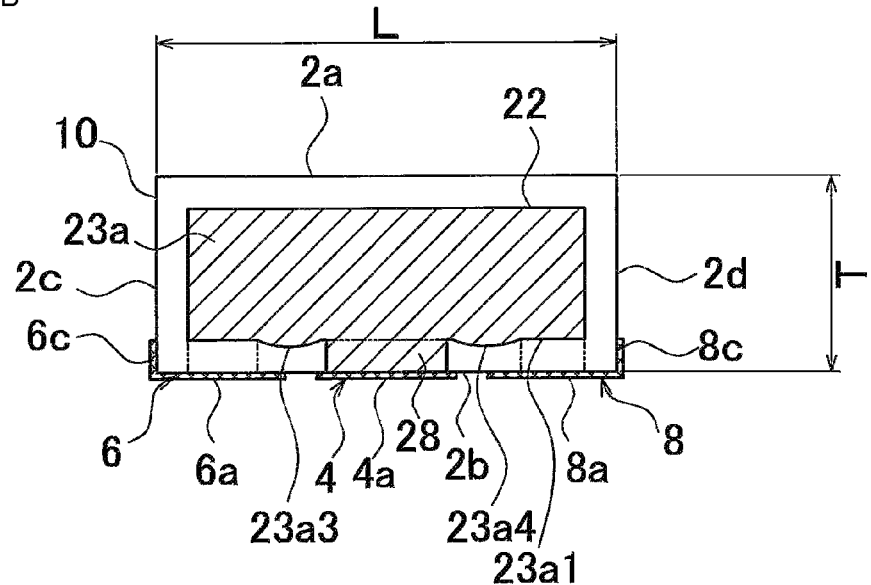

FIGS. 18A and 18B are schematic cross-sectional views of still another example of the multilayer ceramic electronic component according to a preferred embodiment of the invention. In FIGS. 18A and 18B, the same reference numerals are given to the same components and portions as those in the multilayer ceramic capacitor 1 shown in FIGS. 1 to 3, and the detailed descriptions thereof will be omitted.

According to the multilayer ceramic capacitor 1, the first and second facing portions 23a and 23b respectively include portions which are positioned on the side of the second surface 2b beyond portions of the first-side extending portion 24, the second-side extending portion 26, and the center extending portion 28 at the closest positions to the first surface 2a. Therefore, it is possible to increase the area where the first facing portion 23a and the second facing portion 23b face each other while suppressing deterioration of the moisture resistance by securing the lengths of the first-side extending portion 24, the second-side extending portion 26, and the center extending portion 28, and to thus increase the capacitance.

That is, the second facing portion 23b may include second projecting portions 23b3 and 23b4 which project toward the side of the second surface 2b in a region (first edge 23b1) where the first-side extending portion 24 and the second-side extending portion 26 are not provided in the length direction L when viewed from the height direction T as shown in FIG. 18A. In addition, the first facing portion 23a may include first projecting portions 23a3 and 23a4 which project toward the side of the second surface 2b in a region (first edge 23a1) where the center extending portion 28 is not provided in the length direction L when viewed from the height direction T, as shown in FIG. 18B. With such a configuration, the first projecting portion 23a3 and the second projecting portion 23b3 face each other in the width direction W. The first projecting portion 23a4 and the second projecting portion 23b4 face each other in the width direction W. For this reason, it is possible to increase the capacitance by an amount corresponding to the first projecting portions 23a3 and 23a4 and the second projecting portions 23b3 and 23b4. However, the lengths of the first-side extending portion 24, the second-side extending portion 26, and the center extending portion 28 are the same as those in the case where the first projecting portions 23a3 and 23a4 and the second projecting portions 23b3 and 23b4 are not provided. Therefore, it is possible to increase the capacitance of the multilayer ceramic capacitor 1 without an accompanying deterioration of the moisture resistance.

In addition, the length of the first projecting portions 23a3 and 23a4 and the second projecting portions 23b3 and 23b4 in the height direction T preferably is equal to or greater than about 0.003 mm and equal to or less than about 0.007 mm, for example.

In addition, the shapes of the first facing portion 23a and the second facing portion 23b can be checked by observing the first facing portion 23a and the second facing portion 23b, which appear after polishing the multilayer ceramic capacitor 1 from the fifth surface 2e or the sixth surface 2f in the width direction W, at 20-fold magnification by using MM-60 manufactured by Nikon Corporation.

If the installation board 90 as shown in FIG. 14 is bent in the width direction W or at the time of reflow, stress is applied to the multilayer ceramic capacitor 1. The stress applied to the multilayer ceramic capacitor 1 easily focuses on portions of the side outer electrodes 6 and 8 of the multilayer ceramic element 2, at which the third portions 6c and 8c positioned on the third surface 2c and the fourth surface 2d are in contact with the third surface 2c and the fourth surface 2d. Therefore, cracking easily occurs in the multilayer ceramic element 2 from the portions at which the third portions 6c and 8c are in contact with the third surface 2c and the fourth surface 2d.

Figure 19A:
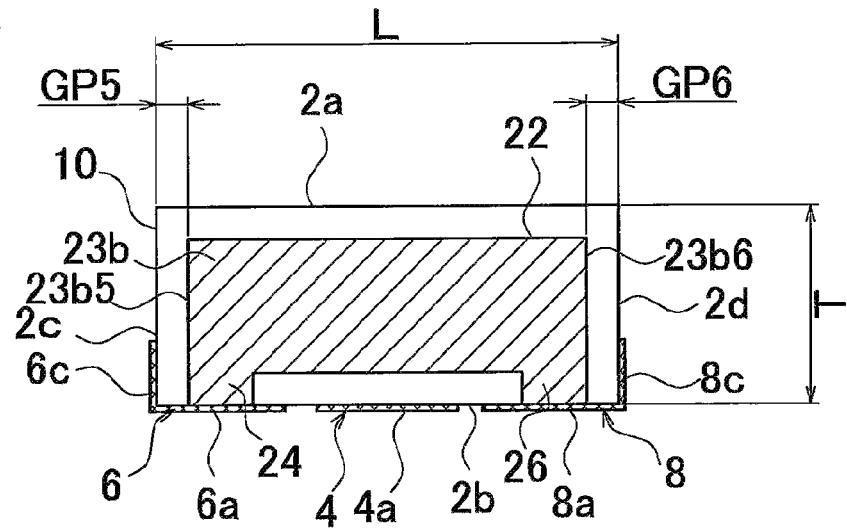
FIGS. 19A and 19B are schematic cross-sectional views of still another modification example of the multilayer ceramic electronic component according to a preferred embodiment of the present invention.
Figure 19B:
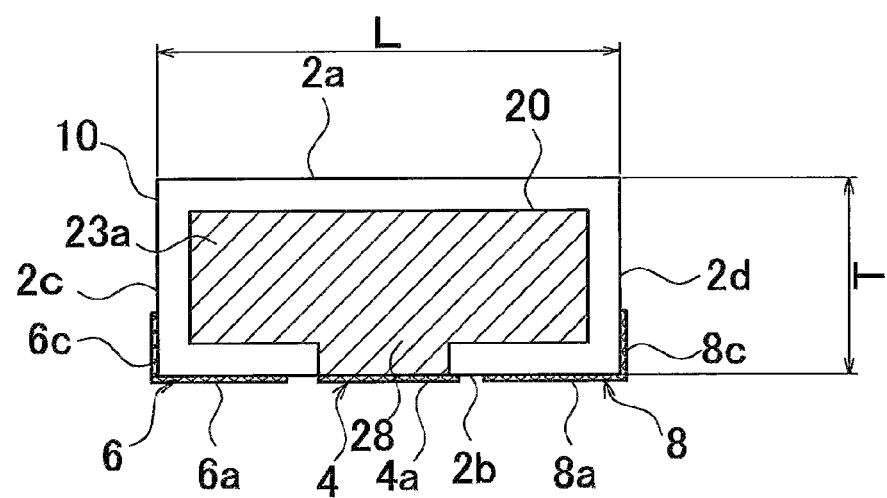

FIGS. 19A and 19B are schematic cross-sectional views of still another modification example of the multilayer ceramic electronic component according to a preferred embodiment of the present invention. In FIGS. 19A and 19B, the same reference numerals are given to the same components and portions as those in the multilayer ceramic capacitor 1 shown in FIGS. 1 to 3, and the detailed descriptions thereof will be omitted.

In order to solve the above problem, as shown in FIGS. 19A and 19B, according to the multilayer ceramic capacitor 1, the third portion 6c of the side outer electrode 6, which is positioned on the third surface 2c, and the third portion 8c of the side outer electrode 8, which is positioned on the fourth surface 2d, may be respectively positioned on the side of the first surface 2a in the height direction T beyond the region where the first facing portion 23a and the second facing portion 23b face each other in the width direction W. That is, the third portions 6c and 8c may be overlapped with the portion, at which the first facing portion 23a and the second facing portion 23b face each other in the width direction W, in the height direction T. With such a configuration, it is possible to make it difficult for cracking to occur in the multilayer ceramic element 2 from the portion where the third portions 6c and 8c are in contact with the third surface 2c and the fourth surface 2d. The reason can be considered as follows.

During the baking, the amount of contraction of the conductive paste layer is greater than the amount of contraction of a ceramic green sheet. Therefore, compression stress in a region where an amount of the conductive paste layer per a unit volume is large relatively increases, and compression stress in a region where a presence rate of the conductive paste layer per a unit area is low relatively decreases. Specifically, compression stress in a region where first-side extending portion 24, the second-side extending portion 26, and the center extending portion 28 are present in the height direction T is relatively small, and compression stress in a region where the first facing portion 23a and the second facing portion 23b are present in the height direction T is relatively large. Therefore, if the portions where the third portions 6c and 8c are in contact with the third surface 2c and the fourth surface 2d are positioned in the region where the first-side extending portion 24, the second-side extending portion 26, and the center extending portion 28 are present in the height direction T, for example, tension stress easily occurs at the portions where third portions 6c and 8c are in contact with the third surface 2c and the fourth surface 2d. In contrast, if the portions where the third portions 6c and 8c are in contact with the third surface 2c and the fourth surface 2d are positioned in the region with large contraction stress, in which the first facing portion 23a and the second facing portion 23b face each other in the width direction W, in the height direction T as in the multilayer ceramic capacitor 1 described above, it is possible to make it difficult for tension stress to occur at the portions where the third portions 6c and 8c are in contact with the third surface 2c and the fourth surface 2d. Accordingly, cracking does not easily occur.

In addition, a length of the third portions 6c and 8c in the height direction T preferably is equal to or greater than about 0.12 mm and equal to or less than about 0.20 mm, for example. Moreover, a gap GP5 between a third edge 23b5 of the facing portion 23b of the second inner electrode 22 on the side of the third surface 2c and the third surface 2c of the multilayer ceramic element 2 and a gap GP6 between a fourth edge 23b6 of the facing portion 23b of the second inner electrode 22 on the side of the fourth surface 2d and the fourth surface 2d of the multilayer ceramic element 2 preferably are respectively equal to or greater than about 0.04 mm and equal to or less than about 0.08 mm, for example.

In addition, positional relationships between the third portions 6c and 8c and the first facing portion 23a and the second facing portion 23b can be checked by observing a cross section, which appears after polishing the multilayer ceramic capacitor 1 from the fifth surface 2e or the sixth surface 2f in the width direction W, at 20-magnification by using MM-60 manufactured by Nikon Corporation.

Furthermore, it is preferable to set a current loop to be short from a viewpoint of reducing the equivalent series inductance (ESL) of the installed multilayer ceramic capacitor 1. Therefore, it is preferable to set the lengths of the first-side extending portion 24, the second-side extending portion 26, and the center extending portion 28 in the length direction L to be wide. However, since distances between the exposed ends of the outer electrodes and the extending portions thereof decrease if the lengths of the first-side extending portion 24, the second-side extending portion 26, and the center extending portion 28 are widened, moisture easily enters the extending portions. Therefore, there is a tendency in that moisture resistance deteriorates.

As a result of intensive study, the present inventors discovered that in a case where the first inner electrodes 20 and the center outer electrode 4 were connected to a positive pole and the second inner electrodes 22 and the side outer electrodes 6 and 8 were connected to a negative pole, the moisture resistance did not easily deteriorate on the negative pole side even if distances from the exposed ends of the side outer electrodes 6 and 8 to the first-side extending portion 24 and the second-side extending portion 26 were short while the moisture resistance deteriorated on the positive pole side if a distance from the exposed end of the center outer electrode 4 to the center extending portion 28 was short.

Figure 20A:
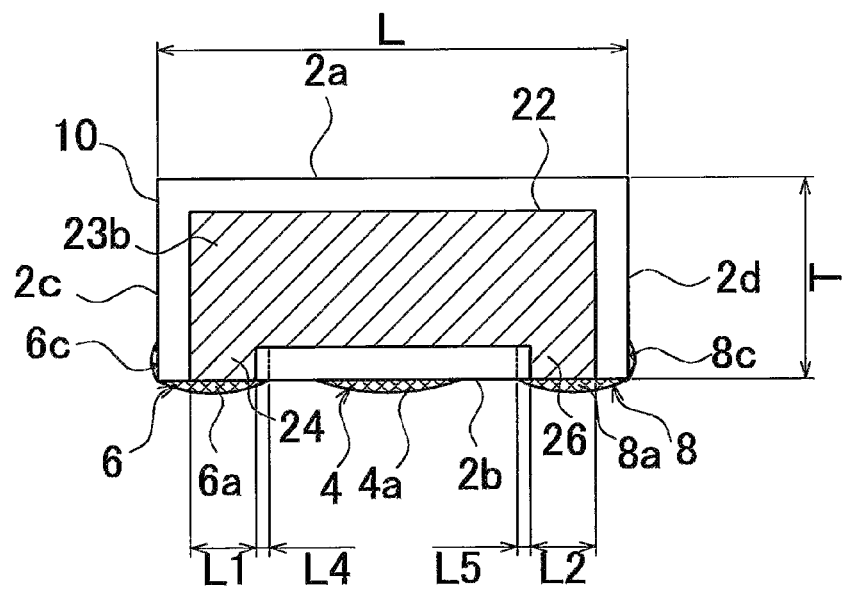
FIGS. 20A and 20B are schematic cross-sectional views of still another modification example of the multilayer ceramic electronic component according to a preferred embodiment of the present invention.
Figure 20B:
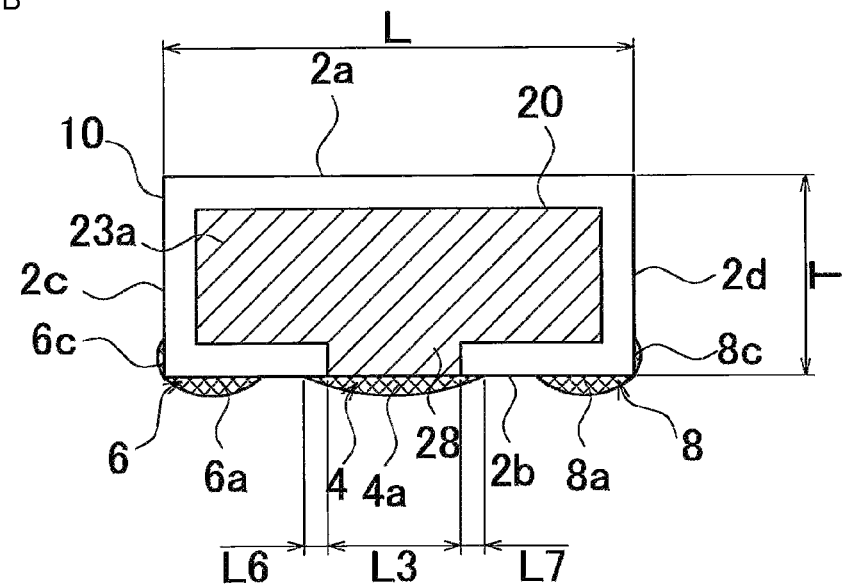

FIGS. 20A and 20B are schematic cross-sectional views of still another modification example of the multilayer ceramic electronic component according to a preferred embodiment of the present invention. In FIGS. 20A and 20B, the same reference numerals are given to the same components and portions as those in the multilayer ceramic capacitor 1 shown in FIGS. 1 to 3, and the detailed descriptions thereof will be omitted.

The present inventors achieved, based on the aforementioned knowledge, an idea that it was possible to reduce the ESL by setting L3>L1 and L3>L2 and setting a dimension L3 of the center extending portion 28 of the first inner electrode 20 (positive pole) in the length direction L to be large and to realize excellent moisture resistance by setting L6>L4 and L7>L5 and extending a distance between the exposed end of the center outer electrode 4 to the center extending portion 28 as shown in FIGS. 20A and 20B.

Here, L1 is a dimension of the first-side extending portion 24 in the length direction L, L2 is a dimension of the second-side extending portion 26 in the length direction L, and L3 is a dimension of the center extending portion 28 in the length direction L. In addition, L4 is a dimension of a portion of the side outer electrode 6, which is positioned on the side of the center outer electrode 4 beyond the first-side extending portion 24 in the length direction L, in the length direction L, and L5 is a dimension of a portion of the side outer electrode 8, which is positioned on the side of the center outer electrode 4 beyond the second-side extending portion 26 in the length direction L, in the length direction L. Furthermore, L6 is a dimension of a portion of the center outer electrode 4, which is positioned on the side of the side outer electrode 6 beyond the center extending portion 28 in the length direction L, in the length direction L, and L7 is a dimension of a portion of the center outer electrode 4, which is positioned on the side of the side outer electrode 8 beyond the center extending portion 28 in the length direction L, in the length direction L.

That is, since the following Equations (1) to (4) are preferably satisfied in the multilayer ceramic capacitor 1, it is possible to reduce the ESL of the installed multilayer ceramic capacitor 1 while maintaining excellent moisture resistance of the multilayer ceramic capacitor 1.

$$L3>L1 \tag{1}$$

$$L3>L2 \tag{2}$$

$$L6>L4 \tag{3}$$

$$L7>L5 \tag{4}$$

In addition, the dimensions of L1, L2, L3, L4, L5, L6, and L7 can be checked by observing an inner electrode, which appears after polishing the multilayer ceramic capacitor 1 from the fifth surface 2e or the sixth surface 2f in the width direction W, at 20-magnification by using MM-60 manufactured by Nikon Corporation.

In addition, the reason why the moisture resistance does not deteriorate on the side of the second inner electrodes 22 (negative pole) even if the distances from the exposed ends of the side outer electrodes 6 and 8 to the first-side extending portion 24 and the second-side extending portion 26 are short while the moisture resistance deteriorates on the side of the first inner electrodes 20 (positive pole) if the distance between the exposed end of the center outer electrode 4 to the center extending portion 28 is short can be considered as follows. If water enters the inside of the multilayer ceramic capacitor, protons (H$^+$) are generated as represented by the following Equation (5). The reaction of Equation (5) occurs only on the positive side and does not occur on the negative side. If protons generated at the positive pole move to the negative pole, the insulation resistance (IR) of the multilayer ceramic capacitor decreases.

$$H_2O \rightarrow H^+ + 1/2O_2 + 2e^- \qquad (5)$$

Therefore, if it is possible to prevent generation of protons at the positive pole, it is possible to significantly reduce or prevent a decrease in the insulation resistance (IR). For this reason, it is possible to improve the moisture resistance of the multilayer ceramic capacitor. Accordingly, the moisture resistance does not deteriorate even if the distances from the exposed ends of the side outer electrodes 6 and 8 to the first-side extending portion 24 and the second-side extending portion 26 are short and moisture can easily reach the second inner electrodes 22 (negative pole). In contrast, since moisture can easily reach the first inner electrodes 20 (positive pole) if the distance from the exposed end of the center outer electrode 4 to the center extending portion 28 is short, moisture can easily reach the first inner electrodes 20 (positive pole), the moisture resistance deteriorates.

The first inner electrodes 20 and the second inner electrodes 22 with large areas face each other in the width direction W via the ceramic layers 10 as inner layers made of a dielectric material. The electrostatic capacitance is generated at the portion where the first inner electrodes 20 and the second inner electrodes 22 face each other via the ceramic layers 10 as inner layers (the portions where the first facing portions 23a of the first inner electrodes 20 and the second facing portions 23b of the second inner electrodes 22 face each other). The first inner electrodes 20 and the second inner electrodes 22 are preferably made of Ag, Cu, Ni, Pd, or an alloy of such metal. In addition, the ceramic layers 10 as inner layers and ceramic layers 12 as outer layers are made of a barium titanate-based material, a strontium titanate-based material, or the like.

According to the multilayer ceramic capacitor 1 configured as described above, the first inner electrodes 20 and the second inner electrodes 22 are arranged so as to be perpendicular or substantially perpendicular to the second surface 2b (in other words, the installation surface) of the multilayer ceramic capacitor 1, and a lamination direction (a direction in which the ceramic layers 10 and 12 are overlapped) is parallel or substantially parallel with the second surface 2b (in other words, the installation surface).

Figure 21:
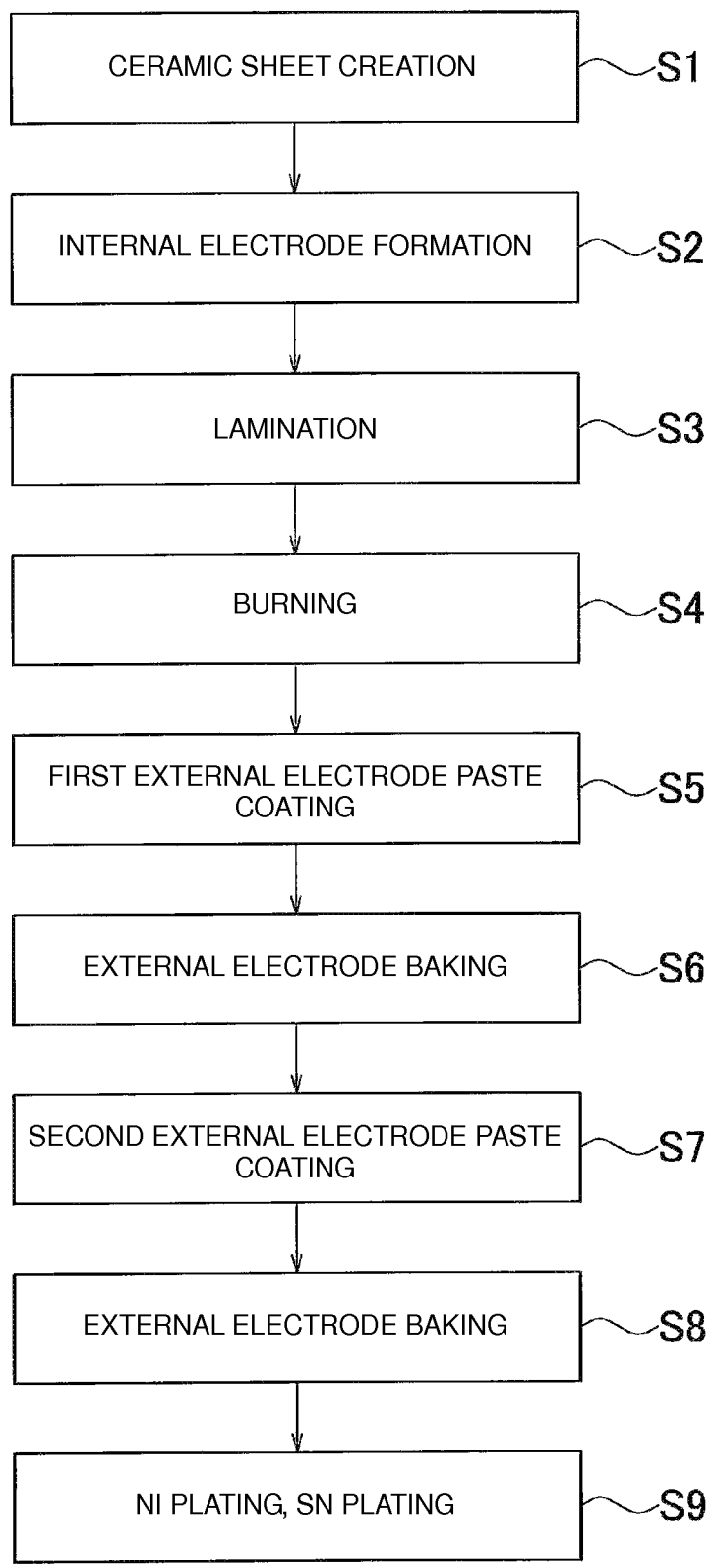
FIG. 21 is a flowchart showing an example of a method of manufacturing the multilayer ceramic electronic component according to a preferred embodiment of the present invention.

Next, a description will be given of a non-limiting example of a method of manufacturing the aforementioned multilayer ceramic capacitor 1. FIG. 21 is a flowchart showing the method of manufacturing the multilayer ceramic capacitor 1.

In Step S1, an organic binder, a dispersant, a plasticizer, and the like are added to ceramic powder made of a barium titanate-based material or a strontium titanate-based material to produce slurry for molding a sheet. Then, the slurry for molding a sheet is molded into ceramic green sheets as inner layers or outer layers by a doctor blade method.

Next, in Step S2, inner electrode paste containing Ag is applied to the ceramic green sheets as inner layers by a screen printing method to form electrode paste films which are to function as the first inner electrodes 20 and the second inner electrodes 22.

Next, in Step S3, the plurality of ceramic green sheets as inner layers on which the electrode paste films are formed are laminated such that the electrode paste films as the first inner electrodes 20 and the electrode paste films as the second inner electrodes 22 are alternately provided. Furthermore, the plurality of ceramic green sheets as outer layers are laminated and press-fitted so as to interpose the laminated ceramic green sheets as inner layers therebetween. The thus obtained multilayer ceramic green sheet is cut into a dimension of each multilayer ceramic element 2, and a plurality of unbaked multilayer ceramic elements 2 are obtained.

The ridge portions 3a and 3b of the upper surface (first surface 2a) of each unbaked multilayer ceramic element 2 in the length direction L are subjected to barrel polishing for a predetermined period of time in a state where the multilayer ceramic element 2 on the side of the installation surface (second surface 2b) is held by a holder, and is polished until the R amount of the ridge portions 3a and 3b becomes about 70 μm. Thereafter, the multilayer ceramic element 2 is polished for a predetermined period of time by sandblast polishing until a desired R amount is obtained.

Here, samples of the multilayer ceramic element 2 are produced, and the R amounts thereof are measured by the following method in order to determine polishing conditions for the barrel polishing and the sandblast polishing. A measurement instrument is a KEYENCE digital microscope VHX series.

Each sample of the multilayer ceramic element 2 on the side of the installation surface (second surface 2b) is solidified with resin. Thereafter, the ridge portions 3a and 3b of the upper surface (first surface 2a) in the length direction L are subjected to the barrel polishing and the sandblast polishing for a predetermined period of time.

Figure 22A:
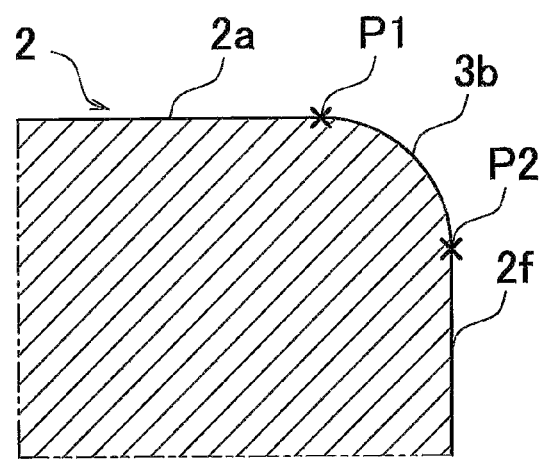
FIGS. 22A and 22B are explanatory diagrams illustrating a method of calculating an R amount of a ridge portion.

Next, the ridge portions 3a and 3b after the R polishing are observed by the measurement instrument, and a start point P1 and an end point P2 of R are designated as shown in FIG. 22A. Thereafter, a center point P3 between the start point P1 and the end point P2 is designated.

Figure 22B:
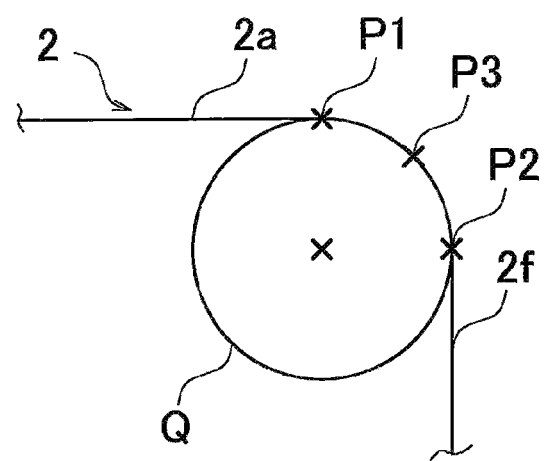

Then, a circle Q which passes through the start point P1, the center point P3, and the end point P2 is depicted as shown in FIG. 22B, a radius of the circle Q is then measured, and the R amount is calculated.

Next, in Step S4, each unbaked multilayer ceramic element 2 is subjected to debinding processing and is baked to obtain a baked multilayer ceramic element 2. The ceramic green sheets as inner layers and outer layers and the electrode paste films are baked at the same time to obtain the ceramic layers 10 as inner layers from the ceramic green sheets as inner layers, the ceramic layers 12 as outer layers from the ceramic green sheets as outer layers, and the first inner electrodes 20 and the second inner electrodes 22 from the electrode paste films.

Next, in Step S5, first application of outer electrode paste (AgPd alloy paste) is performed on the surface of the baked multilayer ceramic element 2. In the first application of the outer electrode paste, application of the outer electrode paste for the center outer electrode 4 and first application of the outer electrode paste for the side outer electrodes 6 and 8 are performed.

The first application of the outer electrode paste is performed by a roller transfer method using an application apparatus 30 shown in FIG. 23. The application apparatus 30 is provided with a pair of application units 32a and 32b arranged at a predetermined interval.

Here, in the case of manufacturing the multilayer ceramic capacitor 1, a paste tank 40b of the application unit 32b is not filled with outer electrode paste 50.

The application unit 32a is provided with an application roller 34a, a scraper 36a which is in pressure contact with the application roller 34a, a transfer roller 38a which is disposed on an upstream side of the scraper 36a and is in pressure contact with the application roller 34a, and a paste tank 40a. Similarly, the application unit 32b is provided with an application roller 34b, a scraper 36b which is in pressure contact with the application roller 34b, a transfer roller 38b which is disposed on an upstream side of the scraper 36b and is in pressure contact with the application roller 34b, and the paste tank 40b.

Figure 24:
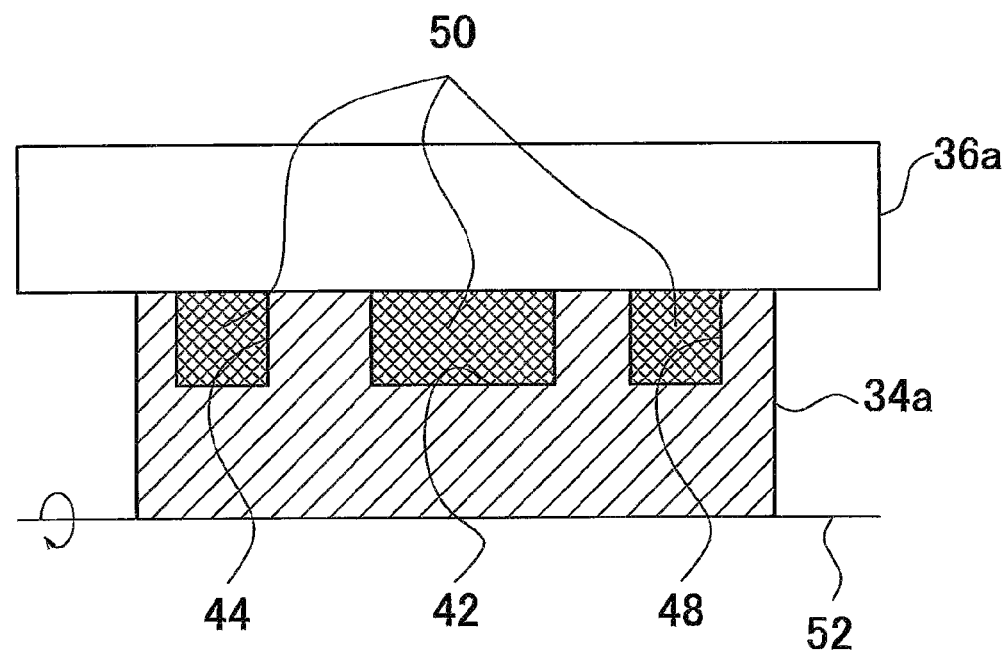
FIG. 24 is a schematic diagram illustrating a method of first application of the outer electrode paste.

In an outer circumferential surface of the application roller 34a, a groove 42 which extends in an outer circumferential direction is formed at a position corresponding to the center outer electrode 4 in the multilayer ceramic capacitor 1, and grooves 44 and 48 which respectively extend in the outer circumferential direction are formed at positions corresponding to the side outer electrodes 6 and 8 as shown in FIG. 24. In an outer circumferential surface of the application roller 34b, the groove 42 which extends in the outer circumferential direction is also formed at the position corresponding to the center outer electrode 4, and the grooves 44 and 48 which respectively extend in the outer circumferential direction are also formed at the positions corresponding to the side outer electrodes 6 and 8 though not shown in the drawing.

In the direction of the rotation shaft 52 of the application rollers 34a and 34b, a length of the groove 42 formed at each of the center portions of the application rollers 34a and 34b in a direction of a rotation shaft 52 of the application rollers 34a and 34b is set to be a dimension which is equal or substantially equal to a length of the center outer electrode 4. A length of the grooves 44 and 48 formed at each of the right and left end portions of the application rollers 34a and 34b is set to be a dimension which is equal or substantially equal to a length of the side outer electrodes 6 and 8. The grooves 42, 44, and 48 have rectangular, substantially rectangular, U-shaped, triangular, or semicircular transverse cross sections, for example.

The scrapers 36a and 36b are configured to scrape off extra outer electrode paste 50 which is supplied to outer circumferential surfaces of the application rollers 34a and 34b by the transfer rollers 38a and 38b, respectively and adheres on the outer circumferential surfaces and for filling the grooves 42, 44, and 48 with the outer electrode paste 50.

The transfer rollers 38a and 38b are configured to extract the outer electrode paste 50 received in the paste tanks 40a and 40b and to supply the outer electrode paste 50 to the application rollers 34a and 34b, respectively.

The plurality of multilayer ceramic element 2 are transported between the application unit 32a and the application unit 32b in the application apparatus 30 by a pair of carrier tapes 49 while the third surface 2c and the fourth surface 2d as opposite end surfaces in the length direction L are attached to and pinched between the pair of carrier tapes 49. Then, when each multilayer ceramic element 2 which is disposed such that the length direction L is parallel or substantially parallel with the rotation shaft 52 of the application rollers 34a and 34b pass between the application roller 34a and the application roller 34b, opposite sides of the multilayer ceramic element 2 are pressed by the application rollers 34a and 34b.

Figure 25:
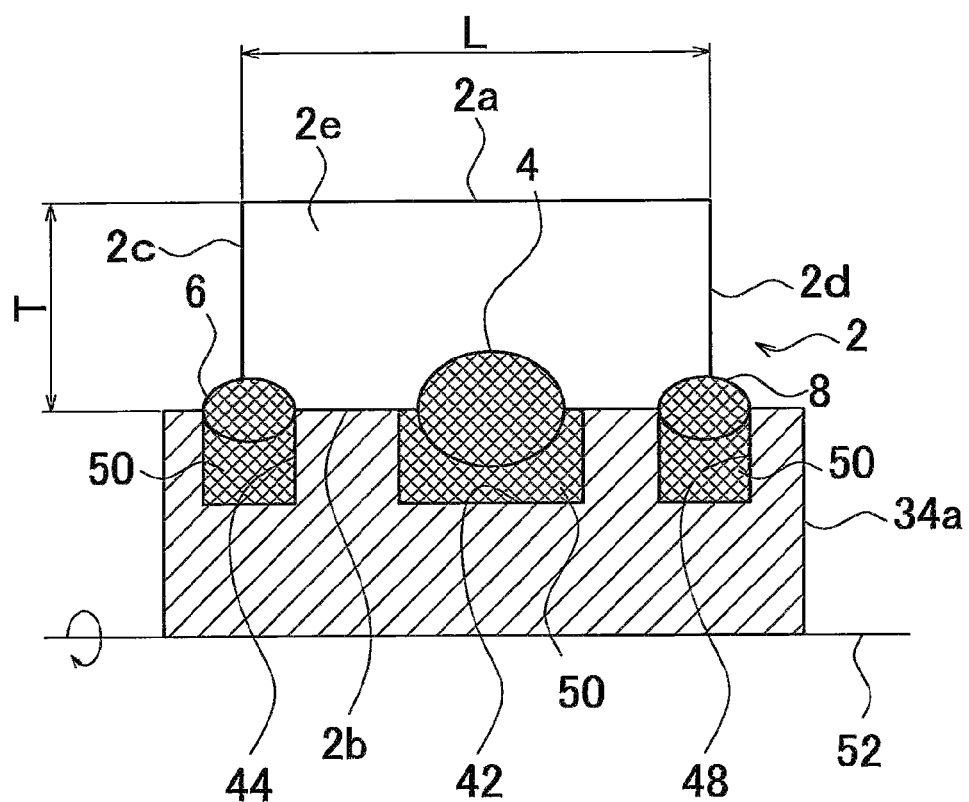
FIG. 25 is a schematic diagram illustrating the method of the first application of the outer electrode paste following the process illustrated in FIG. 24.

At this time, as shown in FIG. 25, a portion of the outer electrode paste 50, with which the grooves 42, 44, and 48 of the application roller 34a are filled, is transferred and applied to the second surface 2b of the multilayer ceramic element 2 in accordance with pattern shapes of the center outer electrode 4 and the side outer electrodes 6 and 8. That is, the application of the outer electrode paste 50 for the center outer electrode 4 and the first application of the outer electrode paste 50 for the side outer electrodes 6 and 8 are performed on the multilayer ceramic element 2.

Since the length of the groove 42 is greater than the length of the grooves 44 and 48 in this case, an application thickness of the outer electrode paste 50 for the center outer electrode 4 is thick, and an application thickness of the outer electrode paste 50 for the side outer electrodes 6 and 8 is thin.

In addition, it is possible to form the center outer electrode 4 and the side outer electrodes 6 and 8 such that the lengths of the center extension body 4b and the side extension bodies 6b and 8b thereof are greater than the lengths of the center main body 4a and the side main bodies 6a and 8a by the application rollers 34a and 34b being strongly pressed against the multilayer ceramic element 2.

In contrast, if the pressing amount of the application rollers 34a and 34b against the multilayer ceramic element 2 is reduced, it is possible to form the center outer electrode 4 including the plurality of convex portions 4b1 and 4b2 as shown in FIG. 10.

Since the application of the outer electrode paste 50 for the center outer electrode 4 and the first application of the outer electrode paste 50 for the side outer electrodes 6 and 8 are performed in the center outer electrode paste application process, the outer electrodes are efficiently formed.

In addition, a transport speed of each multilayer ceramic element 2 by the carrier tapes 49 preferably is set to be equal or substantially equal to an outer circumferential speed of the application rollers 34a and 34b.

Next, in Step S6, the outer electrode paste 50 for the first electrode 4 and the outer electrode paste 50 applied in the first application for the side outer electrodes 6 and 8 on the multilayer ceramic element 2 are baked. With such an operation, the center outer electrode 4 and center outer electrode portions for the side outer electrodes 6 and 8 are formed. At this time, the electrode thickness of the center outer electrode 4 is thick, and the electrode thickness of the side outer electrodes 6 and 8 is thin.

In addition, the center outer electrode 4 and the side outer electrodes 6 and 8 may be collectively baked in Step S8 by omitting Step S6 and directly moving on to Step S7 from Step S5.

Next, in Step S7, a second application of the outer electrode paste (AgPd alloy paste) is performed on the surface of the multilayer ceramic element 2. In the second application of the outer electrode paste, only the second application of the outer electrode paste for the side outer electrodes 6 and 8 is performed.

Figure 26:
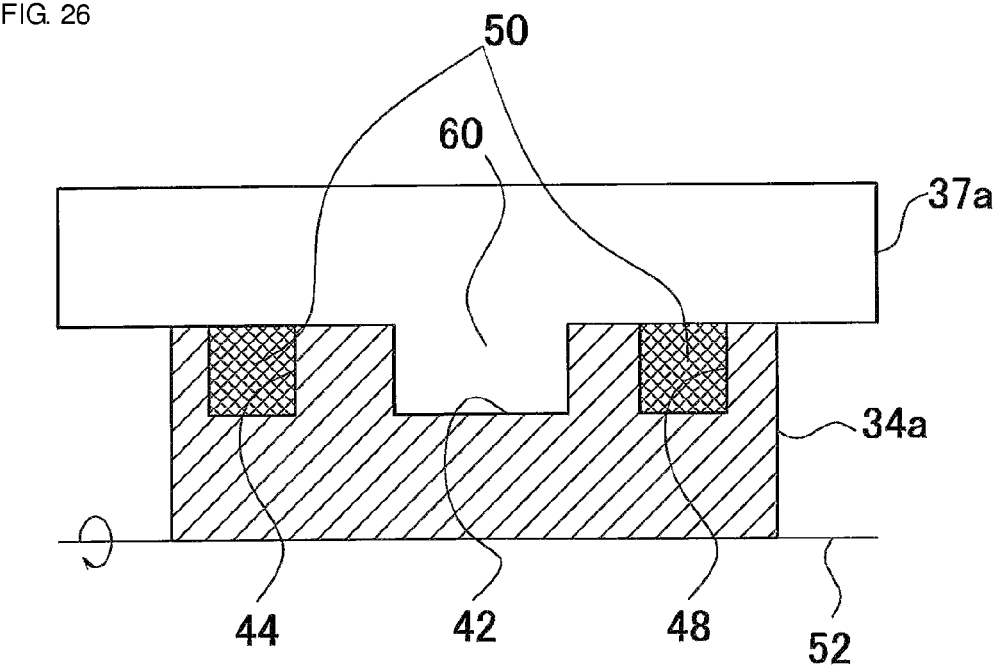
FIG. 26 is a schematic diagram illustrating a method of second application of the outer electrode paste.

The second application of the outer electrode paste is performed by the roller transfer method using the same application apparatus as the application apparatus 30 which is used for the first application of the outer electrode paste and is shown in FIG. 23 other than that the scrapers 36a and 36b are replaced with scrapers 37a and 37b shown in FIG. 26.

Here, in the case of manufacturing the multilayer ceramic capacitor 1, the paste tank 40b of the application unit 32b is not filled with the outer electrode paste 50.

The scrapers 37a and 37b include scraping units 60, which have a size which is the same or substantially the same as that of the transverse cross-sectional shapes for the groove 42 formed at the center portions of the application rollers 34a and 34b and are provided at positions corresponding to the groove 42. Therefore, the scrapers 37a and 37b scrape off extra outer electrode paste 50 which is supplied to the surfaces of the application rollers 34a and 34b and adheres thereto, scrape the outer electrode paste 50, with which the groove 42 is filled, from the groove 42 by the scraping unit 60, and fill the grooves 44 and 48 with the outer electrode paste 50.

The plurality of multilayer ceramic elements 2 are transported between the application unit 32a and the application unit 32b of the application apparatus 30 by the pair of carrier tapes 49 by the third surfaces 2c and the fourth surfaces 2d thereof as opposite end surfaces in the length direction L being respectively attached to the pair of carrier tapes 49. In addition, when the multilayer ceramic elements 2 which are disposed such that the length direction L thereof is parallel or substantially parallel with the rotation shaft 52 of the application rollers 34a and 34b passes between the application roller 34a and the application roller 34b, the application rollers 34a and 34b are pressed against the opposite sides of the multilayer ceramic elements 2.

Figure 27:
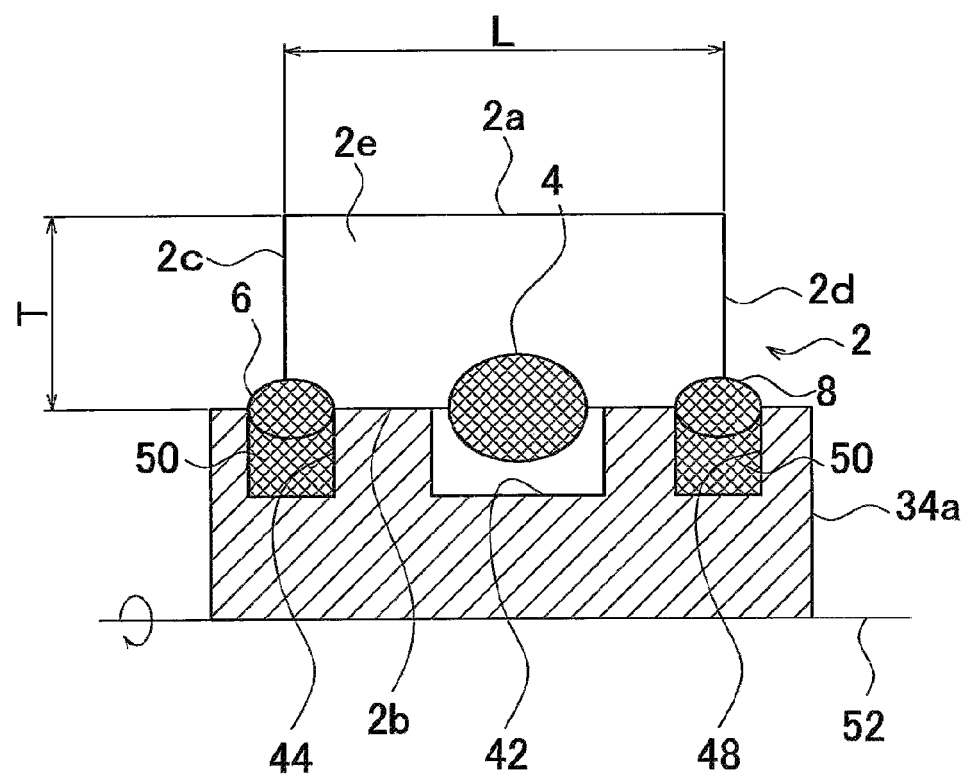
FIG. 27 is a schematic diagram illustrating the method of the second application of the outer electrode paste after the process in FIG. 26.

At this time, as shown in FIG. 27, a portion of the outer electrode paste 50 with which the grooves 44 and 48 of the application rollers 34a and 34b are filled is transferred and applied to the second surface 2b of each multilayer ceramic element 2 in accordance with pattern shapes of the side outer electrodes 6 and 8. That is, the second application of the outer electrode paste 50 for the side outer electrodes 6 and 8 is further performed on the surface of the outer electrodes after the first application for the side outer electrodes 6 and 8. With such an operation, the electrode thickness of the side outer electrodes 6 and 8 become greater than the electrode thickness of the center outer electrode 4.

In addition, since a portion of the center outer electrode 4 is accommodated in the groove 42 in the application roller 34a, the posture of each multilayer ceramic element 2 is improved, and application precision is improved.

Next, in Step S8, the outer electrode paste 50 provided in the second application for the side outer electrodes 6 and 8 in the multilayer ceramic element 2 are baked. With such an operation, the center outer electrode 4 and the portions of the side outer electrodes 6 and 8 corresponding to the second application are formed. As described above, the side outer electrodes 6 and 8 are preferably formed to have a greater electrode thickness as an electrode thickness of the center outer electrode 4.

Next, in Step S9, the first plated film 71 and the second plated films 73 and 75 are formed on the surface of the center outer electrode 4 and the side outer electrodes 6 and 8, respectively in order of Ni-plated films and Sn-plated films by wet plating.

The Ni-plated films 71a, 73a, and 75a of the first plated film 71 and the second plated films 73 and 75 are preferably formed in a two-stage procedure. In the first stage, the multilayer ceramic element 2 is dipped into an Ni-plating solution for a predetermined period of time as it is, and Ni plating is performed on the surface of the center outer electrode 4 and the side outer electrodes 6 and 8. Then, in the second stage, the center outer electrode 4 is masked, and the multilayer ceramic element 2 is then dipped into the Ni-plating solution for a predetermined period of time to perform Ni plating only on the side outer electrodes 6 and 8. Therefore, the film thickness of the Ni-plated films 73a and 75a of the second plated films 73 and 75 becomes greater than the film thickness of the Ni-plated film 71a of the first plated film 71.

Similarly, the Sn-plated films 71b, 73b, and 75b of the first plated film 71 and the second plated films 73 and 75 are preferably formed in a two-stage procedure. In the first stage, the multilayer ceramic element 2 is dipped into an Sn-plating solution for a predetermined period of time as it is, and Sn plating is performed on the center outer electrode 4 and the side outer electrodes 6 and 8. Then, in the second stage, the center outer electrode 4 is masked, the multilayer ceramic element 2 is then dipped into the Sn-plating solution for a predetermined period of time, and Sn plating is performed only on the side outer electrodes 6 and 8. Therefore, the film thickness of the Sn-plated films 73b and 75b of the second plated films 73 and 75 becomes greater than the film thickness of the Sn-plated film 71b of the first plated film 71.

As a result, the film thickness of the second plated films 73 and 75 formed on the surfaces of the side outer electrodes 6 and 8 becomes greater than the film thickness of the first plated film 71 formed on the surface of the center outer electrode 4. The multilayer ceramic capacitor 1 is obtained as described above.

Experimental Examples

1. Evaluation of Variations in R Amount of Ridge Portions of Multilayer Ceramic Capacitor 1

Next, samples obtained by setting the R amount of the ridge portions 3a and 3b of the multilayer ceramic capacitor 1 from about 20 μm to about 90 μm were produced, and an experiment of checking absorption errors and presence of chipping-off and breakage with respect to each R amount was conducted.

Thus, multilayer ceramic capacitors with a dimension in the length direction L of equal to or greater than about 2.00 mm and equal to or less than about 2.10 mm, a dimension in the height direction T of equal to or greater than about 0.7 mm and equal to or less than about 1.0 mm, and a dimension in the width direction W of equal to or greater than about 1.20 mm and equal to or less than about 1.40 mm, for example, were manufactured in accordance with the aforementioned method of manufacturing the multilayer ceramic electronic component.

The adsorption errors were evaluated by causing the multilayer ceramic capacitors to be adsorbed by an adsorption nozzle and counting the number of multilayer ceramic capacitors which dropped off. The number of multiple ceramic capacitors as targets of the adsorption error evaluation was 10000 for each R amount.

The presence of chipping-off and breakage was evaluated by counting the number of events, in which chipping-off and breakage occurred, by causing the multilayer ceramic capacitors to be adsorbed by the adsorption nozzle. The number of multiple ceramic capacitors as targets of the chipping-off and breakage evaluation was 100 for each R amount.

Table 2 shows the number of adsorption errors and the number of events in which the chipping-off and breakage occurred with respect to each R amount.

TABLE 2

| | R amount (μm) | | | | | | | |
|---|---|---|---|---|---|---|---|---|
| | 20 | 30 | 40 | 50 | 60 | 70 | 80 | 90 |
| Adsorption errors (number of events/number of evaluation targets) | 0/10000 | 0/10000 | 0/10000 | 0/10000 | 0/10000 | 0/10000 | 5/10000 | 7/100000 |
| Chipping-off and breakage (number of events/number of evaluation targets) | 5/100 | 0/100 | 0/100 | 0/100 | 0/100 | 0/100 | 0/100 | 0/100 |

According to Table 2, no adsorption error occurred when the R amount was equal to or greater than about 20 μm and equal to or less than about 70 μm. In contrast, five adsorption errors occurred in a case where the R amount was about 80 μm, and seven adsorption errors occurred in a case where the R amount was about 90 μm.

According to Table 2, no chipping-off and breakage occurred when the R amount was equal to or greater than about 30 μm and equal to or less than about 90 μm. In contrast, chipping-off and breakage occurred five times in a case where the R amount was about 20 μm.

Therefore, it is possible to prevent adsorption errors, chipping-off, and breakage by setting the R amount to be equal to or greater than about 30 μm and equal to or less than about 70 μm, for example.

2. Evaluation of Relationship Between Width Dimensions of Outer Electrodes and Dimensions of Extending Portions Thirty six multilayer ceramic capacitors with substantially the same configuration as that of the multilayer ceramic capacitor 1 shown in FIGS. 20A and 20B were produced under the following conditions. A voltage of 4 V was applied to the produced samples for 500 hours in an environment at a temperature of 85° C. and a humidity of 85% RH. Thereafter, insulation resistance (IR) was measured. As a result, samples with log IR under about $10^{5.7}$ were determined to be defective products, and samples with log IR of equal to or greater than about $10^{5.7}$ were determined to be non-defective products. The result will be shown in Table 3.

Size of multilayer ceramic capacitor: 2.0 mm (L)×1.25 mm (W)×0.7 mm (T) (Design Value)

Ceramics: $BaTiO_3$

Capacitance: 47 μF

Rated voltage: 4 V

Configuration of each outer electrode: first layer: Cu-fused electrode, second layer; Ni-plated film, third layer: Sn-plated film

TABLE 3

| | L4, L5 (μm) | L6, L7 (μm) | L1, L2 (μm) | L3 (μm) | ESL (pH) | Number of events of IR deterioration/ number of samples |
|---|---|---|---|---|---|---|
| Example 1 | 70 | 90 | 250 | 500 | 47.0 | 0/36 |
| Example 2 | 70 | 75 | 250 | 530 | 45.5 | 0/36 |
| Comparative Example 1 | 70 | 10 | 250 | 500 | 47.0 | 2/36 |
| Comparative Example 2 | 70 | 180 | 250 | 240 | 60.0 | 0/36 |
| Comparative Example 3 | 70 | 160 | 250 | 230 | 60.5 | 0/36 |

Based on the results shown in Table 3, it is possible to realize both a decrease in ESL and an improvement in reliability by satisfying L3>L1, L3>L2, L6>L4, and L7>L5.

In addition, the present invention is not limited to the aforementioned preferred embodiments and modifications thereof, and various modifications can be made within the scope of the gist. In the multilayer ceramic capacitor 1 according to a preferred embodiment of the present invention, the length of the exposed end of the center extending portion 28 and the length of the exposed ends of the first-side extending portion 24 and the second-side extending portion 26 gradually change. However, a multilayer ceramic capacitor in which the length of the exposed end of the center extending portion 28 and the length of the exposed ends of the first-side extending portion 24 and the second-side extending portion 26 change in a stepwise manner is also applicable. Similarly, a multilayer ceramic capacitor in which the distance between the exposed end of the first-side extending portion 26 (second-side extending portion 28) and the third surface 2c (fifth surface 2d) of the multilayer ceramic element 2 changes in the stepwise manner is also applicable.

Although the side outer electrodes 6 and 8 preferably have greater electrode thickness than the electrode thickness of the center outer electrode 4 in the multilayer ceramic capacitor 1 according to a preferred embodiment of the present invention, the present invention is not limited thereto.

Furthermore, although the film thickness of the second plated films 73 and 75 provided on the surfaces of the side outer electrodes 6 and 8 preferably is greater than the film thickness of the first plated film 71 provided on the surface of the center outer electrode 4 in the multilayer ceramic capacitor 1 according to a preferred embodiment of the present invention, the present invention is not limited thereto.

Although the center extension body 4b of the center outer electrode 4 preferably has the length B' which is greater than the length B of the center main body 4a of the center outer electrode 4, and the side extension bodies 6b and 8b of the side outer electrodes 6 and 8 are formed to have the length A' which is greater than the length of the side main bodies 6a and 8a of the side outer electrodes 6 and 8 in the multilayer ceramic capacitor 1 according to a preferred embodiment of the present invention, the present invention is not limited thereto.

Furthermore, although the corner portions of the ridge portions 3a and 3b of the first surface 2a, which is the upper surface of the multilayer ceramic capacitor 1, in the length direction L preferably are polished to have the R shapes and the R amount thereof is equal to or less than about 70 μm in the multilayer ceramic capacitor 1 according to a preferred embodiment of the present invention, the present invention is not limited thereto.

Although the gap GP1 provided between the first edge 23a1 of the facing portion 23a of each first inner electrode 20 on the side of the second surface 2b and the second surface 2b of the multilayer ceramic element 2 preferably is smaller than the gap GP2 provided between the second edge 23a2 of the facing portion 23a of the first inner electrode 20 on the side of the first surface 2a and the first surface 2a of the multilayer ceramic element 2, and the gap GP3 provided between the first edge 23b1 of the facing portion 23b of each second inner electrode 22 on the side of the second surface 2b and the second surface 2b of the multilayer ceramic element 2 is set to be smaller than the gap GP4 provided between the second edge 23b2 of the facing portion 23b of the second inner electrode 22 on the side of the first surface 2a and the first surface 2a of the multilayer ceramic element 2 in the multilayer ceramic capacitor 1 according to a preferred embodiment of the present invention, the present invention is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer ceramic element including a first surface and a second surface extending in a length direction and a width direction, a third surface and a fourth surface extending in the width direction and a height direction, and a fifth surface and a sixth surface extending in the length direction and the height direction;
   a first-side outer electrode and a second-side outer electrode which are on opposite end portions of the second surface and a center outer electrode between the first-side outer electrode and the second-side outer electrodes;
   first inner electrodes which extend in the length direction and the height direction; and
   second inner electrodes which extend in the length direction and the height direction and face the first inner electrode at interval in the width direction; wherein
   each of the first inner electrodes includes:
      a first facing portion which faces one of the second inner electrodes; and
      a center extending portion which extends from the first facing portion to the second surface and is exposed at the second surface;
   each of the second inner electrodes includes:
      a second facing portion which faces one of the first inner electrodes;
      a first-side extending portion which extends from the second facing portion to the second surface and is exposed at a portion of the second surface on one side in the length direction; and
      a second-side extending portion which extends from the second facing portion to the second surface and is exposed at a portion of the second surface on another side in the length direction; wherein
   the center outer electrode includes a center main body on the second surface and connected to the center extending portions and center extension bodies connecting the center main body and respectively located on the fifth and sixth surfaces;
   the first-side outer electrode includes a side main body which is located on the second surface and connected to the first-side extending portions and side extension bodies connecting the side main body and which are respectively located on the fifth and sixth surfaces;
   the second-side outer electrode includes a side main body which is located on the second surface and connected to the second-side extending portions and side extension bodies connecting the side main body and which are respectively located on the fifth and sixth surfaces;
   a first plated film is provided on the center outer electrode;
   second plated films are provided on the first-side outer electrode and the second-side outer electrode, respectively; and
   a thickness of each of the second plated films is greater than a thickness of the first plated film.

2. The multilayer ceramic electronic component according to claim 1, wherein a dimension of the center main body in the length direction is greater than a dimension of each of the side main bodies of the first-side outer electrode and the second-side outer electrode in the length direction.

3. The multilayer ceramic electronic component according to claim 1, wherein
   the first plated film includes a first Ni-plated film and a first Sn-plated film provided on the Ni-plated film;
   each of the second plated films on the first-side outer electrode and the second-side outer electrode includes a second Ni-plated film and a second Sn-plated film provided on the second Ni-plated film.

4. The multilayer ceramic electronic component according to claim 3, wherein a thickness of each of the second Ni-plated films of the second plated films on the first-side outer electrode and the second-side outer electrode is greater than a thickness of the first Ni-plated film of the first plated film.

5. The multilayer ceramic electronic component according to claim 1, wherein
   the thickness of the first plated film is equal to or greater than about 6 μm and equal to or less than about 8 μm; and
   the thickness of each of the second plated films is equal to or greater than about 9 μm and equal to or less than about 11 μm.

6. The multilayer ceramic electronic component according to claim 1, wherein
   the thickness of the Ni-plated film of the first plated film is equal to or greater than about 2 μm and equal to or less than about 3 μm; and the thickness of each of the Ni-plated films of the second plated films on the first-side outer electrode and the second-side outer electrode is equal to or greater than about 4 μm and equal to or less than about 5 μm.

7. The multilayer ceramic electronic component according to claim 1, wherein
the second inner electrodes are separated from the third surface and the fourth surface;
the first-side outer electrode includes a side extension body connected to the side main body of the first-side outer electrode and located on the third surface; and
the second-side outer electrode includes a side extension body connected to the side main body of the second-side outer electrode and located on the fourth surface.

8. The multilayer ceramic electronic component according to claim 1, wherein a distance between an exposed end of the first-side extending portion positioned nearest to a center of the multilayer ceramic element in the width direction and the third surface is denoted by a distance C, and a distance between an exposed end of the first-side extending portion positioned outermost in the width direction and the third surface is denoted by a distance D, the distance D is greater than the distance C.

9. The multilayer ceramic electronic component according to claim 1, wherein a length of an exposed end of the second-side extending portion positioned nearest to a center of the multilayer ceramic element in the width direction is denoted by a length G, and a length of an exposed end of the second-side extending portion positioned outermost in the width direction is denoted by a length H, the length G is greater than the length H.

10. The multilayer ceramic electronic component according to claim 2, wherein a length of an exposed end of the center extending portion positioned nearest to a center of the multilayer ceramic element in the width direction is denoted by a length E, and a length of exposed end of the center extending portion positioned outermost in the width direction is denoted by a length F, the length E is greater than the length F.

11. The multilayer ceramic electronic component according to claim 1, wherein at least one of the side main bodies includes a thickest portion which is located at a different position from a center of the at least one of the side main bodies in the width direction.

12. A multilayer ceramic electronic component comprising:
a multilayer ceramic element including a first surface and a second surface extending in a length direction and a width direction, a third surface and a fourth surface extending in the width direction and a height direction, and a fifth surface and a sixth surface extending in the length direction and the height direction;
a first-side outer electrode and a second-side outer electrode which are on opposite end portions of the second surface and a center outer electrode between the first-side outer electrode and the second-side outer electrodes;
first inner electrodes which extend in the length direction and the height direction; and
second inner electrodes which extend in the length direction and the height direction and face the first inner electrode at interval in the width direction; wherein
each of the first inner electrodes includes:
a first facing portion which faces one of the second inner electrodes; and
a center extending portion which extends from the first facing portion to the second surface and is exposed at the second surface;
each of the second inner electrodes includes:
a second facing portion which faces one of the first inner electrode;
a first-side extending portion which extends from the second facing portion to the second surface and is exposed at portion of the second surface on one side in the length direction; and
a second-side extending portion which extends from the second facing portion to the second surface and is exposed at portion of the second surface on another side in the length direction; wherein
the center outer electrode includes a center main body on the second surface and connected to the center extending portions and center extension bodies connecting the center main body and respectively located on the fifth and sixth surfaces;
the first-side outer electrode includes a side main body which is located on the second surface and connected to the first-side extending portions and side extension bodies connecting the side main body and which are respectively located on the fifth and sixth surfaces;
the second-side outer electrode includes a side main body which is located on the second surface and connected to the second-side extending portions and side extension bodies connecting the side main body and which are respectively located on the fifth and sixth surfaces;
a Ni-plated film is provided on the center outer electrode;
Ni-plated films are provided on the first-side outer electrode and the second-side outer electrode, respectively; and
a thickness of each of the Ni-plated films on the first-side outer electrode and the second-side outer electrode is greater than a thickness of the Ni-plated film on the center outer electrode.

13. The multilayer ceramic electronic component according to claim 12, wherein a dimension of the center main body in the length direction is greater than a dimension of each of the side main bodies of the first-side outer electrode and the second-side outer electrode in the length direction.

14. The multilayer ceramic electronic component according to claim 12, wherein
the thickness of the Ni-plated film on the center outer electrode is equal to or greater than about 2 μm and equal to or less than about 3 μm; and
the thickness of each of the Ni-plated films on the first-side outer electrode and the second-side outer electrode is equal to or greater than about 4 μm and equal to or less than about 5 μm.

15. The multilayer ceramic electronic component according to claim 12, wherein
the second inner electrodes are separated from the third surface and the fourth surface;
the first-side outer electrode includes a side extension body connected to the side main body of the first-side outer electrode and located on the third surface; and
the second-side outer electrode includes a side extension body connected to the side main body of the second-side outer electrode and located on the fourth surface.

16. The multilayer ceramic electronic component according to 12, wherein a distance between an exposed end of the first-side extending portion positioned nearest to a center of the multilayer ceramic element in the width direction and the third surface is denoted by a distance C, and a distance between an exposed end of the first-side extending portion positioned outermost in the width direction and the third surface is denoted by a distance D, the distance D is greater than the distance C.

17. The multilayer ceramic electronic component according to claim 12, wherein a length of an exposed end of the second-side extending portion positioned nearest to a center of the multilayer ceramic element in the width direction is denoted by a length G, and a length of an exposed end of the second-side extending portion positioned outermost in the width direction is denoted by a length H, the length G is greater than the length H.

18. The multilayer ceramic electronic component according to claim 12, wherein a length of an exposed end of the center extending portion positioned nearest to a center of the multilayer ceramic element in the width direction is denoted by a length E, and a length of exposed end of the center extending portion positioned outermost in the width direction is denoted by a length F, the length E is greater than the length F.

19. The multilayer ceramic electronic component according to claim 12, wherein at least one of the side main bodies includes a thickest portion which is located at a different position from a center of the at least one of the side main bodies in the width direction.

* * * * *